(12) United States Patent  
Hirose et al.

(10) Patent No.: US 7,349,998 B2  
(45) Date of Patent: Mar. 25, 2008

(54) BUS CONTROL SYSTEM FOR INTEGRATED CIRCUIT DEVICE WITH IMPROVED BUS ACCESS EFFICIENCY

(75) Inventors: Yoshio Hirose, Kawasaki (JP); Hiroyuki Utsumi, Kawasaki (JP); Toshiaki Saruwatari, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 162 days.

(21) Appl. No.: 11/136,417

(22) Filed: May 25, 2005

(65) Prior Publication Data

US 2005/0223151 A1    Oct. 6, 2005

Related U.S. Application Data

(62) Division of application No. 09/739,835, filed on Dec. 20, 2000, now Pat. No. 6,917,995.

(30) Foreign Application Priority Data

Jan. 20, 2000    (JP) .............................. 2000-11553

(51) Int. Cl.  
    *G06F 3/00* (2006.01)
(52) U.S. Cl. ........................ 710/29; 710/119
(58) Field of Classification Search .................. 710/15, 710/18, 29, 36, 39, 106–108, 112, 119, 310, 710/313, 240–244  
See application file for complete search history.

(56) References Cited

U.S. PATENT DOCUMENTS 4,380,063 A    4/1983 Janson et al.

5,778,200 A    7/1998 Gulick  
5,784,579 A    7/1998 Pawlowski et al.

(Continued)

FOREIGN PATENT DOCUMENTS

| EP | 0 225 024 A2 | 6/1987 |
|----|--------------|--------|
| JP | 54081041 | 6/1979 |
| JP | 63271629 | 11/1988 |

(Continued)

OTHER PUBLICATIONS

IBM® Technical Disclosure Bulletin, "Local Main Store Bus with Separately Controlled Command and Data Portions", vol. 36, No. 11 Nov. 1993, p. 419.

*Primary Examiner*—Khanh Dang  
(74) *Attorney, Agent, or Firm*—Staas & Halsey LLP

(57) ABSTRACT

The present invention is a command or data transfer between two integrated circuit devices (hereafter LSIs) wherein an LSI issuing a command or data (issuing side LSI) outputs a strobe signal, which indicates that a valid command or data was transmitted, to the LSI which receives the command or data (receiving side LSI), and the receiving side LSI outputs a signal, which notifies that the command processing completed (command ready signal), to the issuing side LSI. The issuing side LSI comprises a counter where a value to indicate the number of commands which the receiving side LSI can simultaneously process or simultaneously receive is loaded at initialization, wherein the counter is decremented when a command or data is issued, the counter is incremented when the ready signal is received, and issuing a command or data is inhibited when the counter becomes "0". Therefore the issuing side LSI can issue a command or data to the receiving side LSI without confirming a busy signal from the receiving side LSI.

1 Claim, 28 Drawing Sheets

U.S. PATENT DOCUMENTS

| | | |
|---|---|---|
| 5,796,968 A | 8/1998 | Takamiya |
| 5,996,037 A | 11/1999 | Emnett |
| 6,108,736 A | 8/2000 | Bell |
| 7,013,360 B2 * | 3/2006 | Lee ............................ 710/305 |

FOREIGN PATENT DOCUMENTS

| | | |
|---|---|---|
| JP | 1088859 | 4/1989 |
| JP | 4170649 | 6/1992 |

* cited by examiner

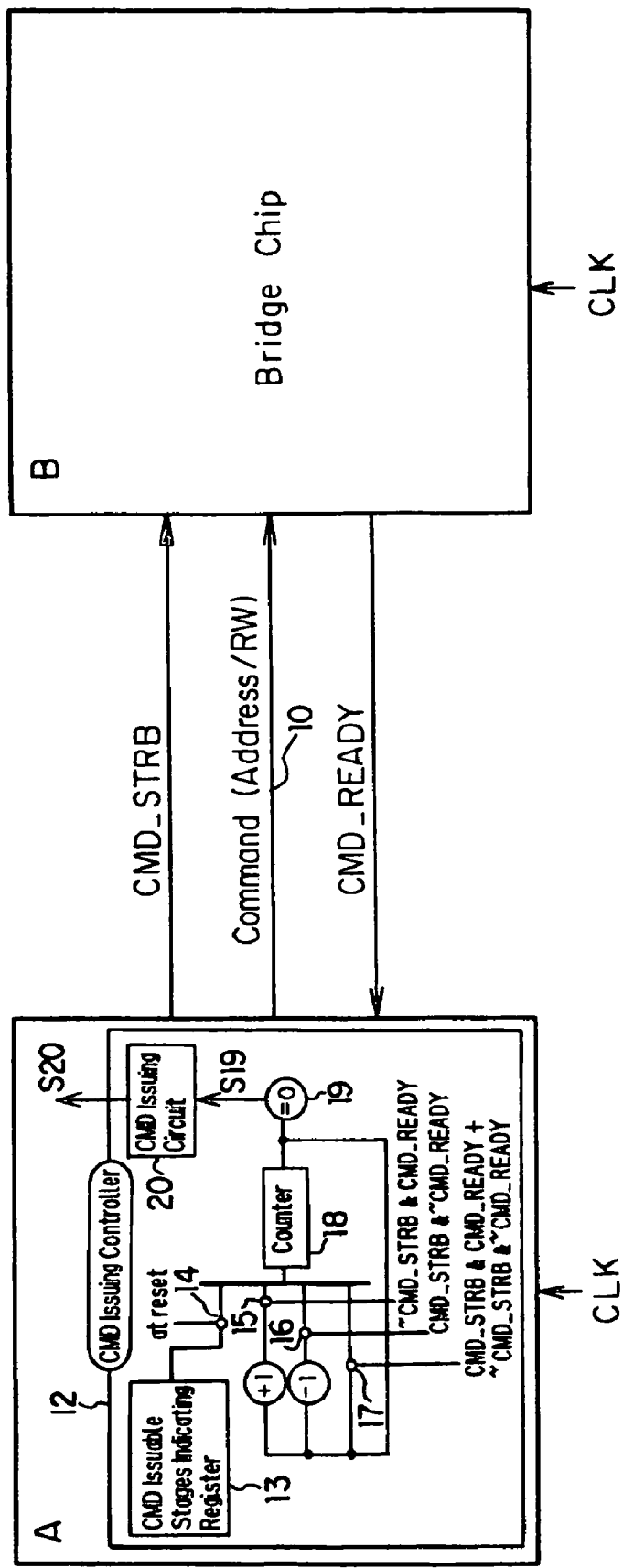

BUS CONTROL SYSTEM FOR INTEGRATED CIRCUIT DEVICE WITH IMPROVED BUS ACCESS EFFICIENCY

CROSS-REFERENCE TO RELATED APPLICATIONS

This application is a divisional application of U.S. application Ser. No. 09/739,835 filed Dec. 20, 2000 now U.S. Pat. No. 6,917,995, now allowed and incorporated by reference herein.

BACKGROUND OF THE INVENTION

1. Field of the Invention

The present invention relates to a bus control system between a microprocessor and peripheral LSIs thereof, and more particularly to a bus control system which can transfer a command and data between chips more efficiently using the bus. The present invention also relates to a bus control system which allows a burst transfer of data more efficiently.

2. Description of the Related Art

A microprocessor is connected with peripheral chip sets and is mounted on a board of a computer. For example, a microprocessor is connected to a PCI bus where a peripheral device is connected via a bridge IC, and the microprocessor and the bridge IC are connected via a bus.

In other words, the microprocessor issues a command and data, and sends them to the bridge IC via the bus. From the bridge IC as well, a command and data from the device connected with the bridge IC are sent to the microprocessor via the bus. Commands typically include a read and a write, and an address is added to a read command, and an address and data are added to the write command. Data includes data which was read responding to a read command, and write data which corresponds to a write command.

In another example, a microprocessor is connected to a memory controller IC via a bus, and reads from or writes to a memory or another processing LSI connected to the memory controller. The microprocessor is also read or written by the processing LSI.

FIG. 1 are diagrams depicting a conventional bus control between a microprocessor and a peripheral LSI. FIG. 1A is a connection diagram between a microprocessor A and a bridge chip B, and a command (including address and read/write) issued by the microprocessor A is sent to the bridge chip B via a command bus 10. The bridge chip B is connected to a bus 100 which is connected to, for example, an I/O device or a memory controller.

When a command is issued from the microprocessor A to the chip B in the configuration shown in FIG. 1A, it is assumed that the chip B side has the capability to simultaneously process a maximum of four commands from the microprocessor A. In other words, the number of stages of the command buffer for reception in the chip B is four, where a maximum of four commands can be simultaneously received and held.

When the microprocessor A continuously issues commands to the chip B, the chip B cannot process the fifth command. Therefore, the chip B must notify the microprocessor A that the chip B cannot accept the fifth command. In prior art, when the chip B is processing four commands internally and cannot receive a new command, the chip B outputs the busy signal BUSY to the microprocessor A to stop the microprocessor A from issuing a new command.

The strobe signal STRB shown in the time chart in FIG. 1B is a strobe signal to indicate that the command (e.g. address, READ/WRITE) on the command bus 10 is in a valid cycle. Each time the microprocessor A sends a command, the microprocessor A outputs the strobe signal STRB to indicate that the command is valid. In FIG. 1B, four commands, 1-4, are continuously issued from the microprocessor A to the chip B in the cycles 1 to 4, but the internal command buffer of the chip B becomes full when the fourth command 4 is received. So the chip B outputs the busy signal BUSY to the microprocessor A from the next cycle 5. The microprocessor A issues the fifth command in the cycle 5, but recognizes that the chip B does not receive the command 5 by the busy signal BUSY.

In this prior art, the chip B outputs the busy signal BUSY from the cycle next to the cycle when the command buffer for reception became full. This method is possible in an area where the operating frequency is slow, but if the operating frequency is high, the busy signal BUSY cannot be output at the cycle next to the cycle when the command buffer becomes full. Therefore, the microprocessor A, when issuing the command, must confirm whether the busy signal BUSY was output from the chip B before issuing the next command, so that in the end the microprocessor A can issue the next command only one cycle after issuing a command.

As the time chart in FIG. 1B shows, if the output of the busy signal BUSY delays one cycle, the busy signal BUSY is output from the cycle 6, so the microprocessor A erroneously recognizes that the fifth command 5, which was output in the cycle 5, was received by the chip B. To prevent this, the microprocessor A issues the next command two cycles after issuing the command, and checks whether the command was received by the presence of the busy signal BUSY at that time, as shown in the time chart in FIG. 1C. Therefore the microprocessor A can issue a command only once every two cycles, which decreases the bus access efficiency.

The above problem occurs not only to a command bus but to a data bus as well. Also, the same problem occurs not only when a command or data is transferred from the microprocessor A to the chip B, but also when a command or data is transferred in the opposite direction.

Also when a command or data is transferred between chips via a two-way bus, a bus arbiter circuit is required to decide which chip has the bus access right. But the above conventional system is inappropriate to employ a two-way bus, and the number of buses are required to be doubles.

SUMMARY OF THE INVENTION

With the foregoing in view, it is an object of the present invention to provide a new bus control system with increased bus access efficiency.

It is another object of the present invention to provide a bus control system which allows issuing and transferring a command or data without decreasing the bus access efficiency, even when the operating frequency of the buses is high-speed.

It is still another object of the present invention to provide a bus control system which allows accessing a two-way bus more efficiently.

It is still another object of the present invention to provide a bus control system which allows accessing a bus efficiently in a burst transfer.

To achieve the above objects, an aspect of the present invention is a command or data transfer between two integrated circuit devices (hereafter LSIs) wherein an LSI issuing a command or data (issuing side LSI) outputs a strobe signal, which indicates that a valid command or data was transmitted, to the LSI which receives the command or data (receiving side LSI), and the receiving side LSI outputs a signal, which notifies that the command processing completed (command ready signal), to the issuing side LSI.

The issuing side LSI comprises a counter where a value to indicate the number of commands which the receiving side LSI can simultaneously process or simultaneously receive is loaded at initialization, wherein the counter is decremented when a command or data is issued, the counter is incremented when the ready signal is received, and issuing a command or data is inhibited when the counter becomes "0". Therefore the issuing side LSI can issue a command or data to the receiving side LSI without confirming a busy signal from the receiving side LSI.

As described above, the command or data issuing side LSI can control the status of the command buffer or data buffer of the receiving side LSI, so a command or data can be efficiently issued even if the bus is operating at high-speed.

BRIEF DESCRIPTION OF THE DRAWINGS

FIGS. 2A-2C are diagrams depicting the command issuing control according to the first embodiment;

DETAILED DESCRIPTION OF THE PREFERRED EMBODIMENTS

Embodiments of the present invention will now be described with reference to the accompanying drawings. These embodiments, however, do not limit the technical scope of the present invention. In the embodiments, bus control between a microprocessor and a bridge LSI are used as an example for description, however the present invention is not limited to such a combination but can be widely applied to bus control between two LSIs. In the following embodiments, an address as well as a command are transferred to the command bus, but an address may be transferred via a data bus or via an independent address bus.

[Command Issuing Control]

Figure 1A:
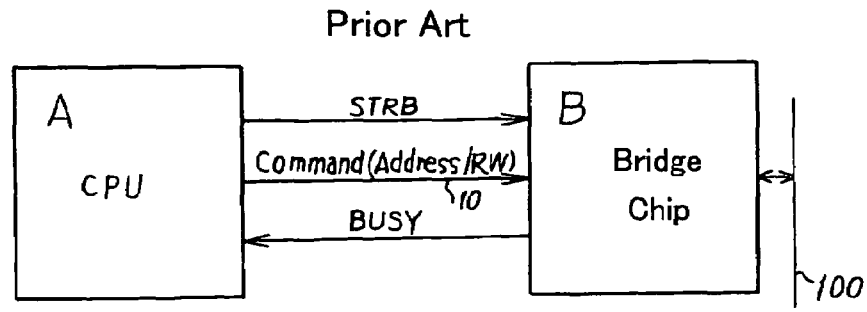
FIGS. 1A-1C are diagrams depicting a conventional bus control between a microprocessor and a peripheral LSI thereof.
Figure 1B:
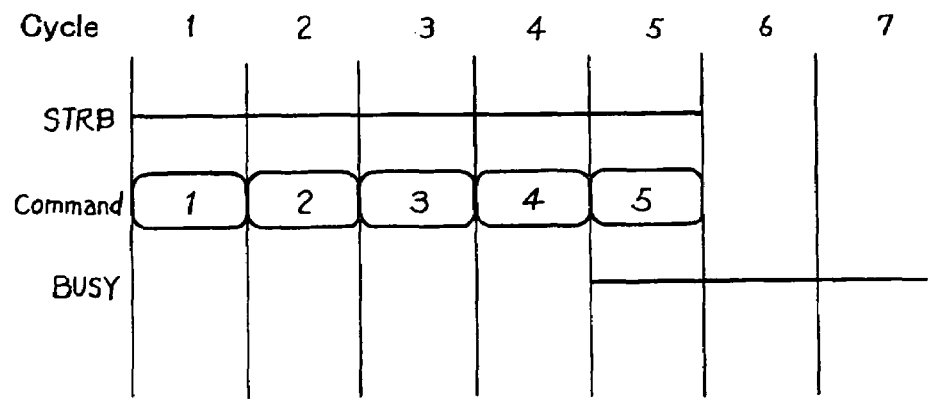
Figure 1C:
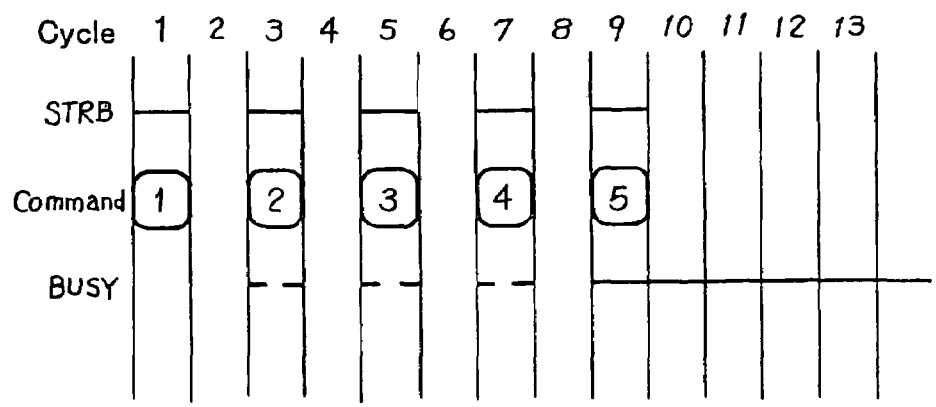
Figure 2B:
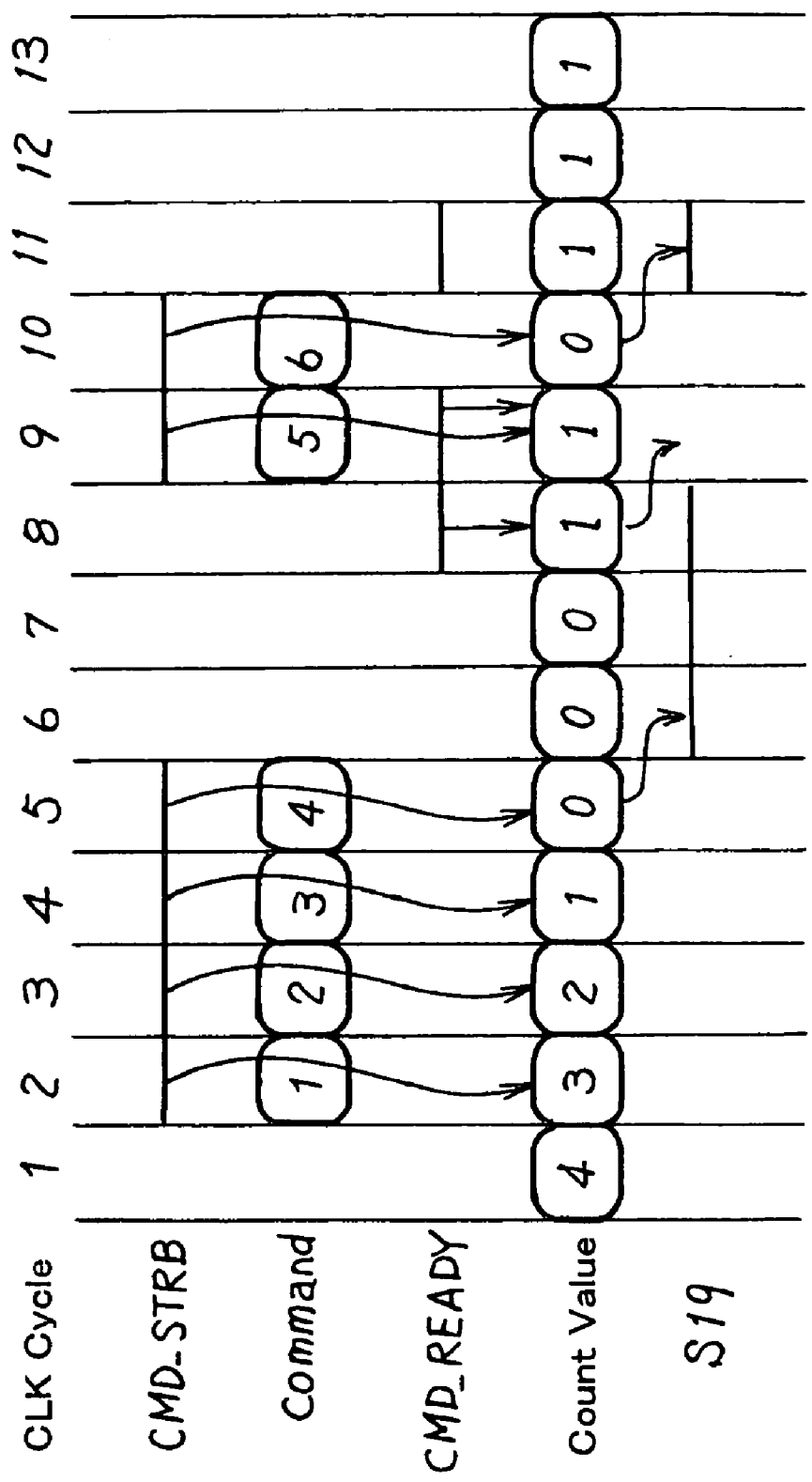
Figure 2C:
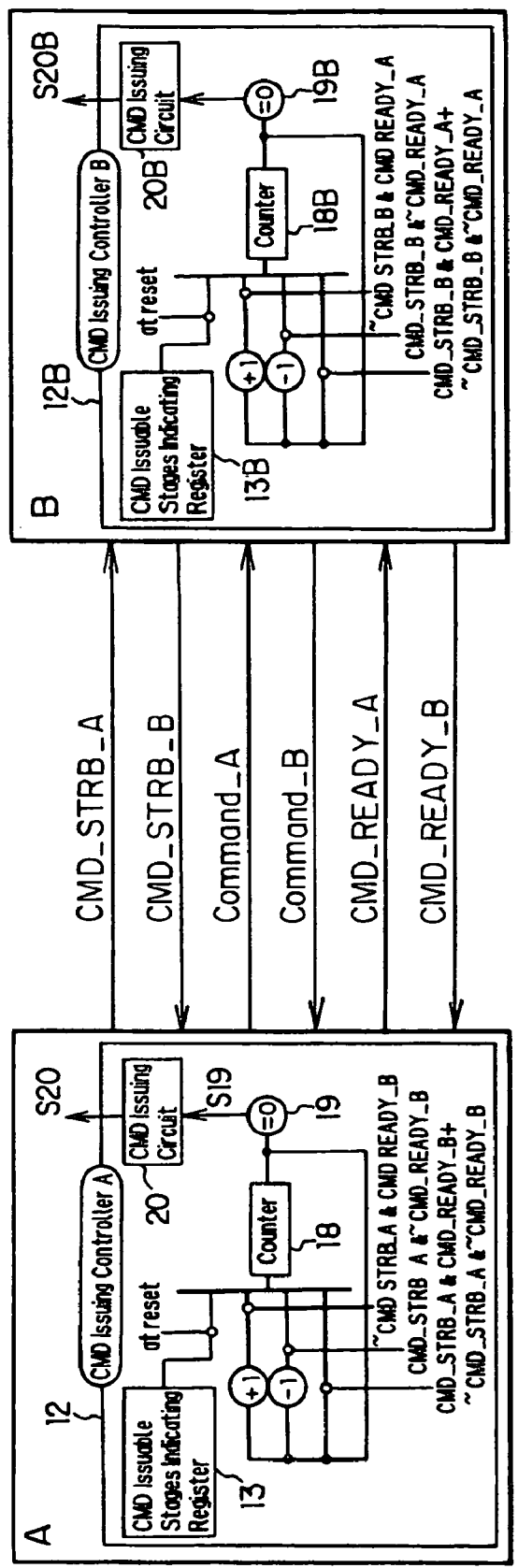
Figure 3:
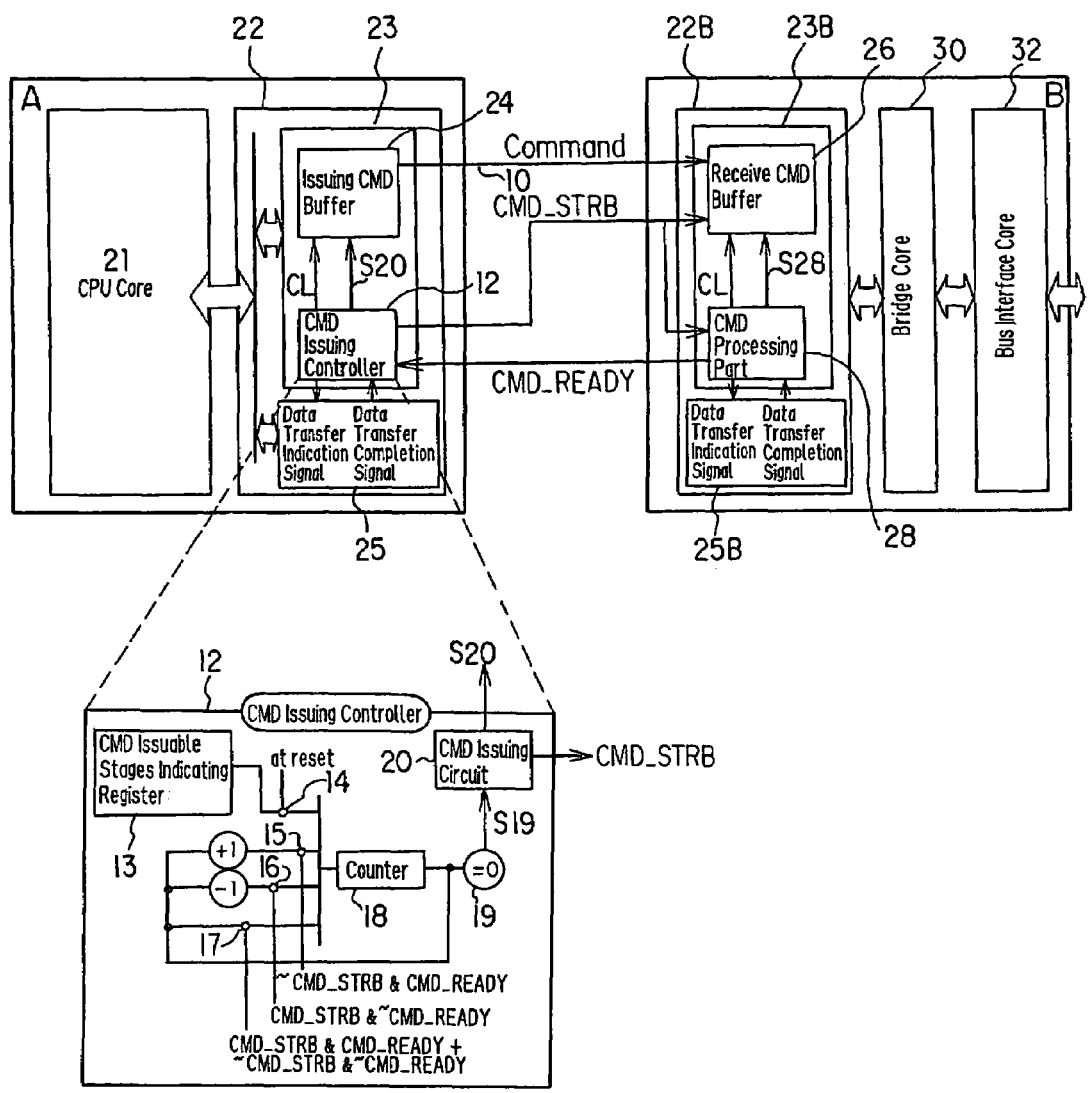
FIG. 3 is a detailed block diagram depicting the microprocessor and the bridge chip in FIG. 2A.

FIGS. 2A-2C are diagrams depicting the command issuing control according to the first embodiment. FIG. 2A is a connection diagram between a microprocessor A and a bridge chip B, and FIG. 2B is an operation timing chart thereof. FIG. 2C is a connection diagram when commands are mutually issued between the microprocessor A and the bridge chip B. FIG. 3 is a diagram depicting the detailed configuration of FIG. 2A.

As FIG. 2A shows, the microprocessor A, at the issuing side LSI which issues a command, comprises a command issuing control circuit 12, and the command issuing control circuit 12 further comprises a issuable stages indication register 13 which holds data on the number of stages to indicating the number of commands which the bridge chip B, that is, the receiving side LSI to receive a command, can simultaneously process, and a counter 18. The command issuing control circuit 12 further comprises switches 14, 15, 16 and 17, a command issuing inhibiting signal generation circuit 19, and a command issuing circuit 20. Each switch is turned ON under the logical conditions, which are illustrated. In the diagrams, "~" indicates negative.

When a command processing completes, the bridge chip B outputs the command ready signal CMD_READY to the microprocessor A, instead of the busy signal BUSY in prior art. This command ready signal CMD_READY is output to the microprocessor A only for one cycle each time one processing for a command issued by the microprocessor A completes.

The microprocessor A (1) turns the switch 14 ON at initialization, and loads the number of stages of the issuable stages indicating register 13 to the counter 18, (2) turns ON the switch 16 responding to the strobe signal CMD_STRB when a command is issued to the bridge chip B, and decrements the counter value, and (3) turns the switch 15 ON when the command ready signal CMD_READY is received from the bridge chip B, and increments the counter value. The count value of the counter 18 is maintained when the strobe signal is issued and the ready signal is also received, and also when the strobe signal is not issued and the ready signal is not received. These increments and decrements are controlled synchronizing with the clock.

When the counter value becomes "0", the microprocessor A outputs the command issuing inhibiting signal S19 to the command issuing circuit 20 so as to inhibit issuing a new command. The command issuing inhibiting signal S19 is generated by the issuing inhibiting signal generation circuit 19. When issuing a command is requested, the command issuing circuit 20 outputs an issuing signal S20 for a new command unless the command issuing inhibiting signal S19 is output.

The specific operation will now be described with reference to the time chart in FIG. 2B. The bridge chip B at the command receiving side can process four commands simultaneously, for example. In other words, the command receive buffer of the bridge chip B can store a maximum of four commands. Therefore "4" is set at the issuable stages indicating register 13 of the microprocessor A. At initialization, such as at a power ON reset, this register value "4" is loaded to the counter 18. The microprocessor A issues the first command to the command bus 10 at the cycle 2, and at the same time, the counter 18 is decremented to "3". When the fourth command is issued at the cycle 5, the counter value becomes "0", the command issuing inhibiting signal S19 is generated, and issuing of a new command is inhibited from the next cycle.

The bridge chip B outputs the first command ready signal CMD_READY at the cycle 8. Also at the cycle 8, the microprocessor A recognizes that one command buffer of the bridge chip B is open (the counter value becomes "1") by the command ready signal CMD_READY, and issues the fifth command at the next cycle 9. Therefore at the cycle 9, the counter 18 is incremented by the command ready signal CMD_READY at the cycle 9, and is decremented by the command strobe signal CMD_STRB simultaneously, and the count value remains unchanged.

Also at the cycle 9, the bridge chip B outputs the command ready signal CMD_READY, and the microprocessor A recognizes this and issues the sixth command at the cycle 10. At the cycle 11, the command ready signal CMD_READY for the third command is output, then the counter value is incremented to "1", since the microprocessor A has no new command to issue.

If the microprocessor A does not issue a command thereafter, the bridge chip B outputs the command ready signal CMD_READY three times, for the fourth to sixth commands, although this operation is not indicated in the time chart. And the microprocessor A increments the counter 18 three times, and returns to the initial status.

As illustrated, the command issuing inhibiting signal S19 is generated at the cycles 6, 7, 8 and 11. In this time chart, at a cycle where the bridge chip B outputs the command ready signal CMD_READY, the microprocessor A checks the signal and judges whether a command can be output at the next cycle. However, when the bus 10 operates at a high-speed frequency, the microprocessor A must recognize the command ready signal CMD_READY, not at the cycle where the bridge chip B outputs the command ready signal, but at the next cycle after the internal flip-flop latches the command ready signal once. In this case as well, although issuing of a command by the microprocessor A is delayed only one cycle, the protocol of the bus has no problems.

Therefore, the commands 1 to 4 are issued at continuous cycles even when the above mentioned bus 10 operates at a high-speed frequency. The command 5 to be issued at the cycle 9, however, is shifted to the cycle 10. Along with this, the command 6 is issued two cycles later. Still the access frequency of the bus 10 is higher than a prior art.

As the detailed block diagram in FIG. 3 shows, the microprocessor A comprises a CPU core 21 and a bus control part 22. The bus control part 22 further comprises a command system control part 23 and a data system control circuit 25, and the command system control part 23 further comprises the above mentioned command issuing control circuit 12 and an issuing command buffer 24. The configuration of the command issuing control part 12 has the same configuration as the one described in FIG. 2.

The command issuing control circuit 12 supplies a command output indication signal S20 to the command buffer for issuing 24, and issues the command to the command bus 10. At this time, the command issuing circuit 20 outputs the command strobe signal CMD_STRB at the same time. This command output indication signal S20 is generated responding to a new command issuing request unless the command issuing inhibiting signal S19 is output. When a command is issued, a corresponding command in the command buffer 24 is deleted by the clear signal CL.

The bridge chip B at the receiving side comprises a bus control part 22B, a bridge core 30, and a bus interface 32 for the lower bus. The bus control part 22B further comprises a command system control part 23B and a data system control part 25B, and the command system control part 23B further comprises a receive command buffer 26 and a command processing part 28. The receive command buffer 26 latches the command signal in the command bus 10 as a valid command signal when the command strobe signal CMD_STRB is received, and transfers the command to the bridge core 30 responding to the transfer instruction S28 of the command processing part 28. When the processing of the command completes, the command processing part 28 issues the command ready signal CMD_READY to the microprocessor A.

In FIG. 2A, a command is issued only in a one-way direction, from the chip A to the chip B. For example, when the chip A is the CPU and the chip B is the bridge LSI which bridges access of the CPU to different buses, normally a command is not issued from the bridge LSI side to the CPU, so issuing a command only in a one-way direction, as described above, is sufficient. However, if a command is also issued from the chip B to the chip A, another set of the control signals shown in FIG. 2A is added to the chip B, as shown in FIG. 2C. Along with this, the command issuing control part 12B and the issuing command buffer 24B (not shown) are required for the chip B, just like the chip A.

In other words, two sets of a command strobe signal line, a command ready signal line and a command bus are required. Since the command signal includes an address, the total number of signal lines becomes excessive if mutual signal lines are disposed from the chip A to the chip B and from the chip B to the chip A.

Figure 4A:
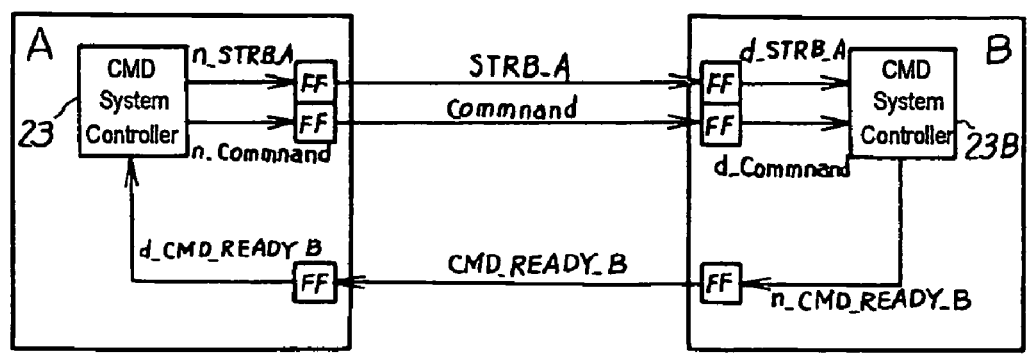
FIGS. 4A-4C are diagrams depicting variant forms of the embodiment.
Figure 4B:
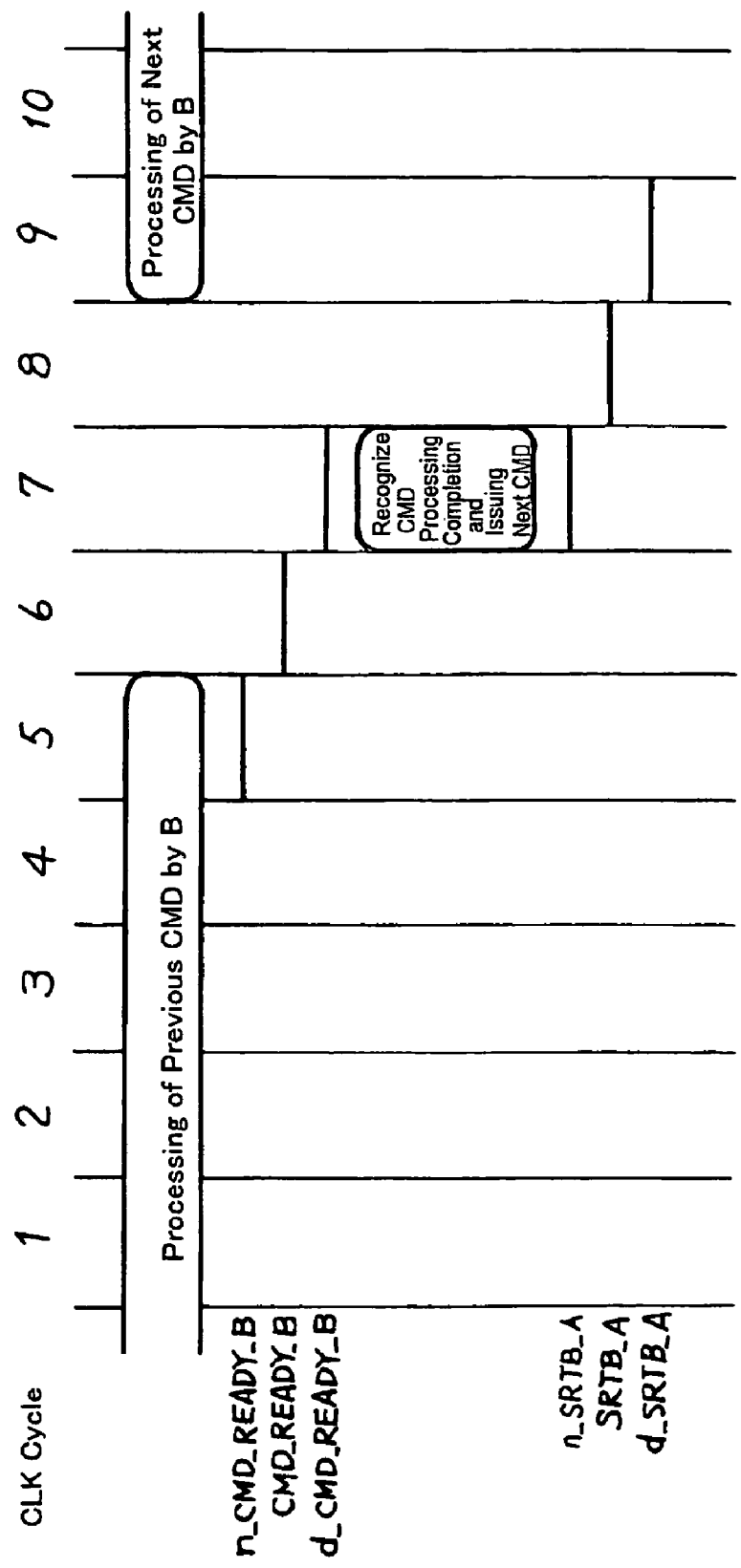
Figure 4C:
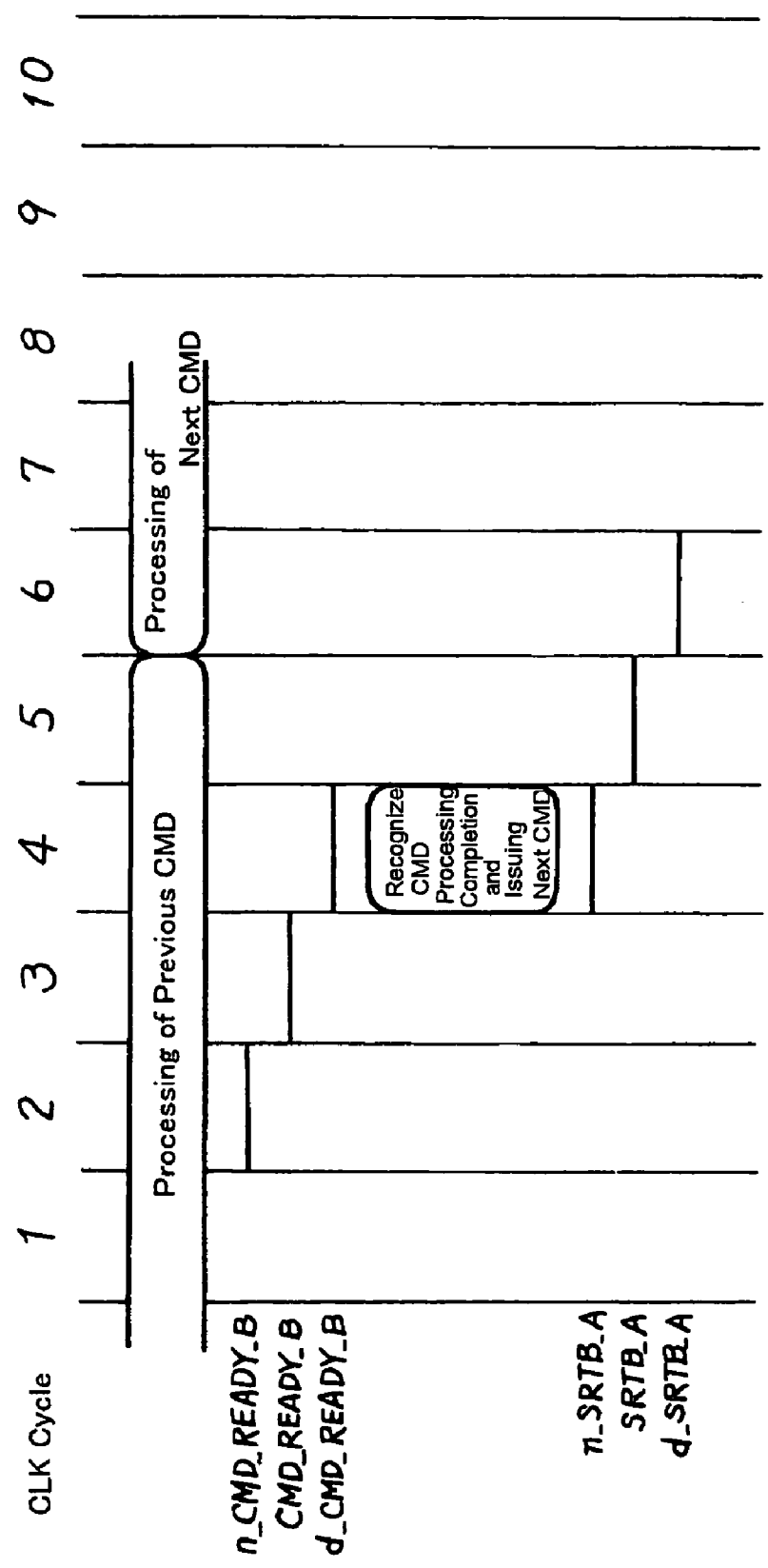

FIGS. 4A-4C are diagrams depicting variant forms of the first embodiment. In the case of the example shown in FIGS. 2A-2C, the bridge chip B, which is the receiving side LSI, outputs the command ready signal CMD READY when a command processing completes. The timing when the bridge chip B outputs the command ready signal CMD_READY, however, may be a timing for predetermined cycles before the completion of processing, and not the timing when processing of the received command is completely finished. The predetermined cycles are cycles required until the command ready signal CMD_READY arrives and is recognized at the issuing side LSI, or cycles required until the issuing side LSI recognizes the command ready signal CMD_READY and issues the next command then the next command reaches the receiving side LSI. The receiving side LSI may output the command ready signal CMD_READY in advance, considering the predetermined cycles. By this, the access efficiency of the bus can be increased even more.

FIG. 4A is a connection diagram of the chips A and B. As the operation cycle becomes shorter due to high-speed frequency clock, flip-flops FF are disposed for the input and the output of each chip A and B respectively. The command control part 23 in the chip A has a flip-flop FF latch the internal strobe signal n_STRB_A along with the internal command signal n_COMMAND tempolary, then issues the signals to the chip B at the next cycle. The chip B also latches the signals to the input flip-flop FF at the clock cycle, and transfers the signals to the command control part 23B at the next cycle. The command control part 23B of the chip B generates the internal command ready signal n_CMD_READY_B at several cycles before completion of the command processing, and supplies the command ready signal to the chip A via a flip-flop in the same way.

FIG. 4B is a time chart when the chip B issues the command ready signal CMD_READY_B when the processing of the command completes. The chip B issues the command ready signal CMD_READY_B at the cycle 6, but each flip-flop causes a one cycle delay respectively, so the chip B receives the next command and begins processing at the cycle 9.

FIG. 4C is an example when the chip B issues the command ready signal CMD_READY_B at three cycles before the completion of the command processing. In this way, the chip B can start processing the next command at the cycle next to the cycle 5 when the processing of the previous command completes.

[Command Bus Control]

FIG. 5 are diagrams depicting the command bus control according to the second embodiment. In the case of the example in FIG. 2C where unidirectional command buses are disposed, the number of bus lines is enormous. In FIG. 5, the command bus Command is a bi-directional bus, and the command bus is shared for the chip A to the chip B direction and the chip B to the chip A direction. As a result, the control of the access right to the command bus is required.

Figure 5A:
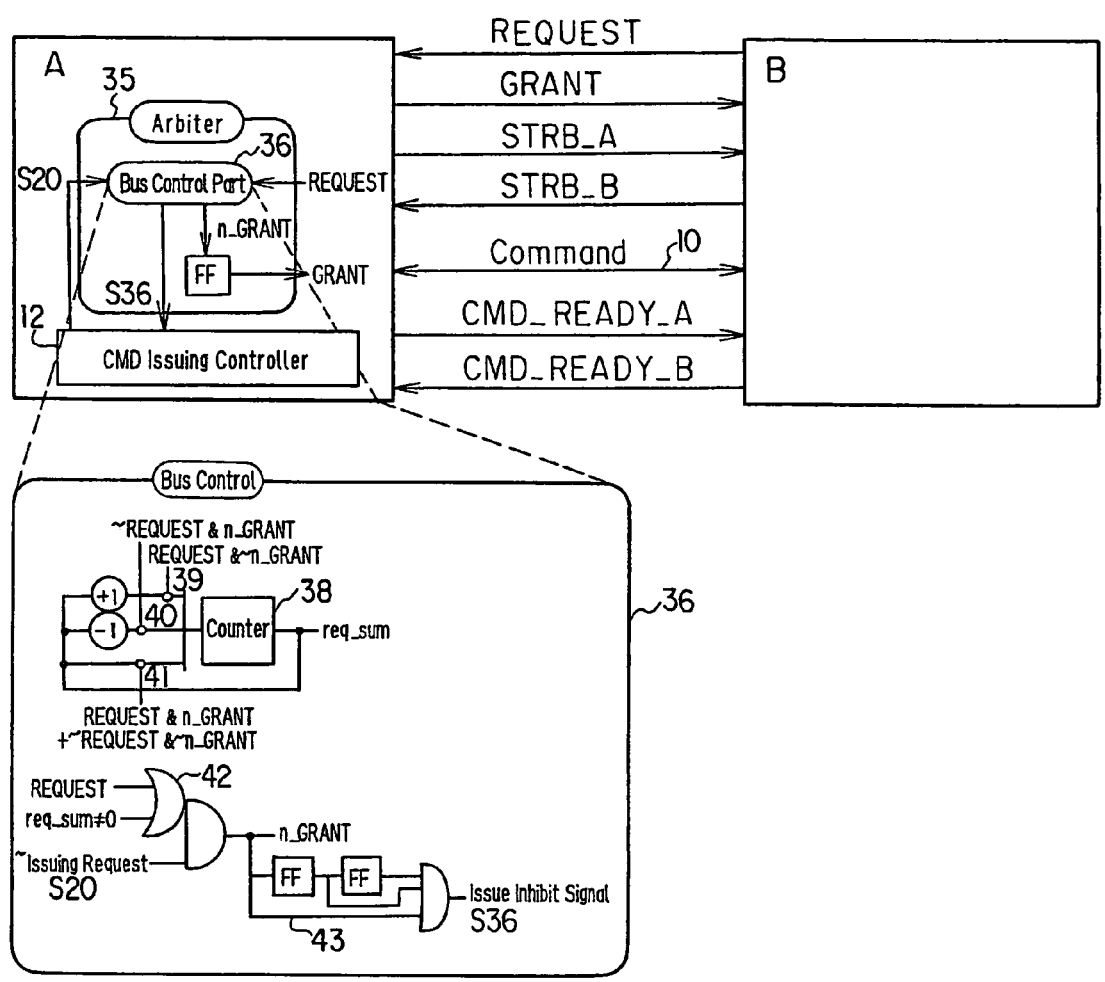
FIGS. 5A-5B are diagrams depicting the command bus control according to the second embodiment.

FIG. 5A is a connection diagram between the microprocessor A and the bridge chip B. Since the command bus 10 is a bi-directional bus, the request signal REQUEST from the chip B to the chip A and the grant signal GRANT from the chip A to the chip B are added. The chip A also has an arbiter circuit 35 for controlling the access right of the bi-directional command bus 10.

The operation will now be described with reference to the timing chart in FIG. 5B. During normal times, the chip A has the access right to the command bus, and the chip A outputs the command A1 to the command bus 10 at the same time along with the command strobe signal STRB_A whenever necessary (cycle 2). When the chip B must output a command, the chip B outputs the request signal REQUEST only for one cycle (cycle 4). When the chip A recognizes the request signal REQUEST, the chip A outputs the grant signal GRANT to the chip B unless the chip A itself is going to use the command bus 10. In the time chart, the chip A outputs the grant signal GRANT at the next cycle 5. When the chip B receives the grant signal GRANT, the chip B outputs the command B1 to the command bus 10 at the next cycle 6 (cycle 6).

When the chip B must continuously issue commands, the chip B outputs the request signal REQUEST for the number of commands, and the chip A also outputs the grant signal GRANT for the same number of times. In the time chart, the chip B outputs the request signal REQUEST at the cycle 6 and the cycle 8, and the chip A outputs the grant signal GRANT at two cycles, the cycle 8 and the cycle 9. In response to this, the chip B outputs the commands B2 and B3 at two cycles, the cycle 10 and the cycle 11.

FIG. 5A shows an example of the arbiter circuit which controls the above mentioned bus right. The arbiter circuit 35 comprises a bus control part 36, and a flip-flop FF which latches the internal grant signal n_GRANT and outputs the grant signal GRANT. The control part 36 generates a grant signal when the chip A does not issue a command based on the issuing request signal S20 from the command issuing control circuit 12, and supplies the issuing inhibiting signal S36 to the command issuing control circuit 12.

The bus control part 36 has a counter 38 for counting the number of grant signals. This counter value is "0" at reset. When the command request signal REQUEST from the chip B is received, the bus control part increments the counter 38 by turning the switch 390N unless the grand signal is issued (in FIG. 5A~n_GRANT). When the chip A issues the grant signal GRANT, the bus control part decrements the counter 38 via the switch 40 unless the request signal is received. When the request signal is received and the grant signal is issued, and also when the request signal is not received and the grant signal is not issued, the switch 41 turns ON and the count value of the counter 38 is maintained. In other words, the counter 38 has a total value of the request signals for which a grant signal was not returned. Since the request signal is issued only for one cycle, the chip A must record the value in the counter 38. The increment and decrement of the counter are also executed synchronizing with the system clock.

When the counter value req_sum of the counter 38 is not "0" and the command issuing control circuit 12 has not output the issuing request signal S20, the OR/AND gate 42 generates the grant signal n_GRANT and grants the access right to the command bus 10 to the chip B. In this case, the issuing inhibiting signal S36 is supplied to the command issuing control circuit 12 so as to inhibit issuing a command from the chip A thereafter. Even when the counter value of the counter 38 is "0", if the request signal REQUEST is received and the issuing request signal S20 has not been output, the OR/AND gate 42 generates the grant signal n_GRANT immediately, and generates the issuing inhibiting signal S36 via the circuit 43 comprising a flip-flop and a NOR gate.

Figure 5B:
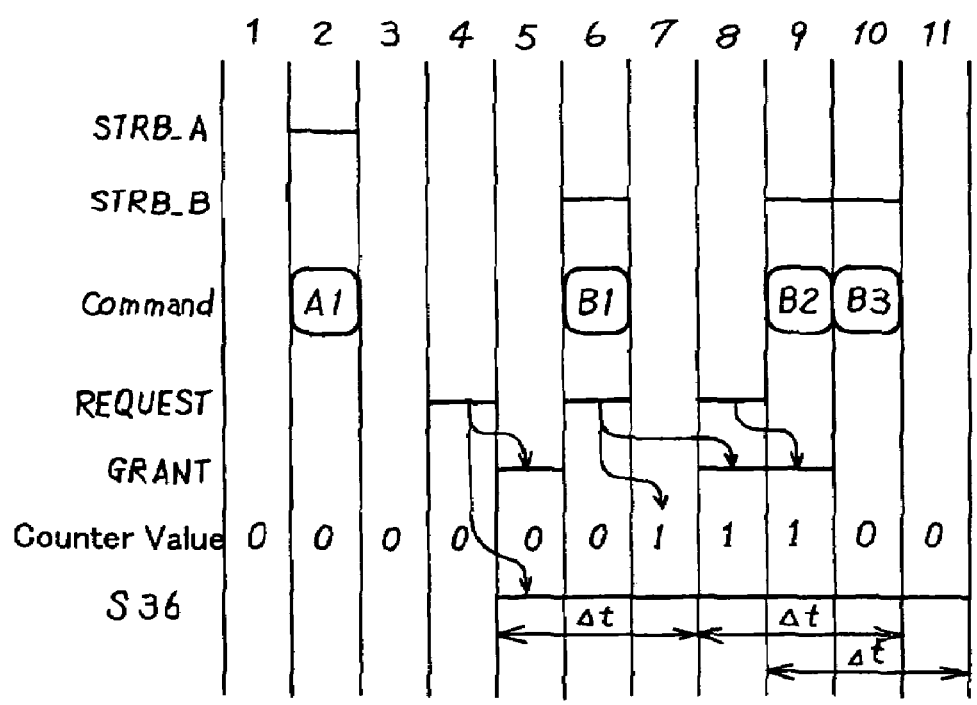

As FIG. 5B shows, the issuing inhibiting signal S36 is generated, and the issuing of a command from the chip A is inhibited during the cycle period Δt of the cycles 5, 6 and 7. In order to prevent bus contention, the chip B issues a command at the cycle 6, which is the center of the three cycles, and the commands issued from the chip A in the cycles before and after are inhibited.

As mentioned above, the bus arbiter circuit 35 gives the access right to the bus 10 to the chip A with priority, and gives the bus access right to the chip B responding to the request signal from the chip B only when the chip A is not using the command bus 10.

In the above example, the arbiter circuit 35 of the chip A outputs the grant signal GRANT when the chip A is not going to output a command, but the arbiter circuit of chip A may output the grant signal GRANT and give priority to the chip B to access the bus when the request signal REQUEST is detected, even if the chip A is going to output a command. When priority is given to the access from the chip B, if the chip B asserts the request signal REQUEST, the chip A always outputs the grant signal GRANT at the next cycle, so the grant signal GRANT from the chip A can be omitted.

Figure 6:
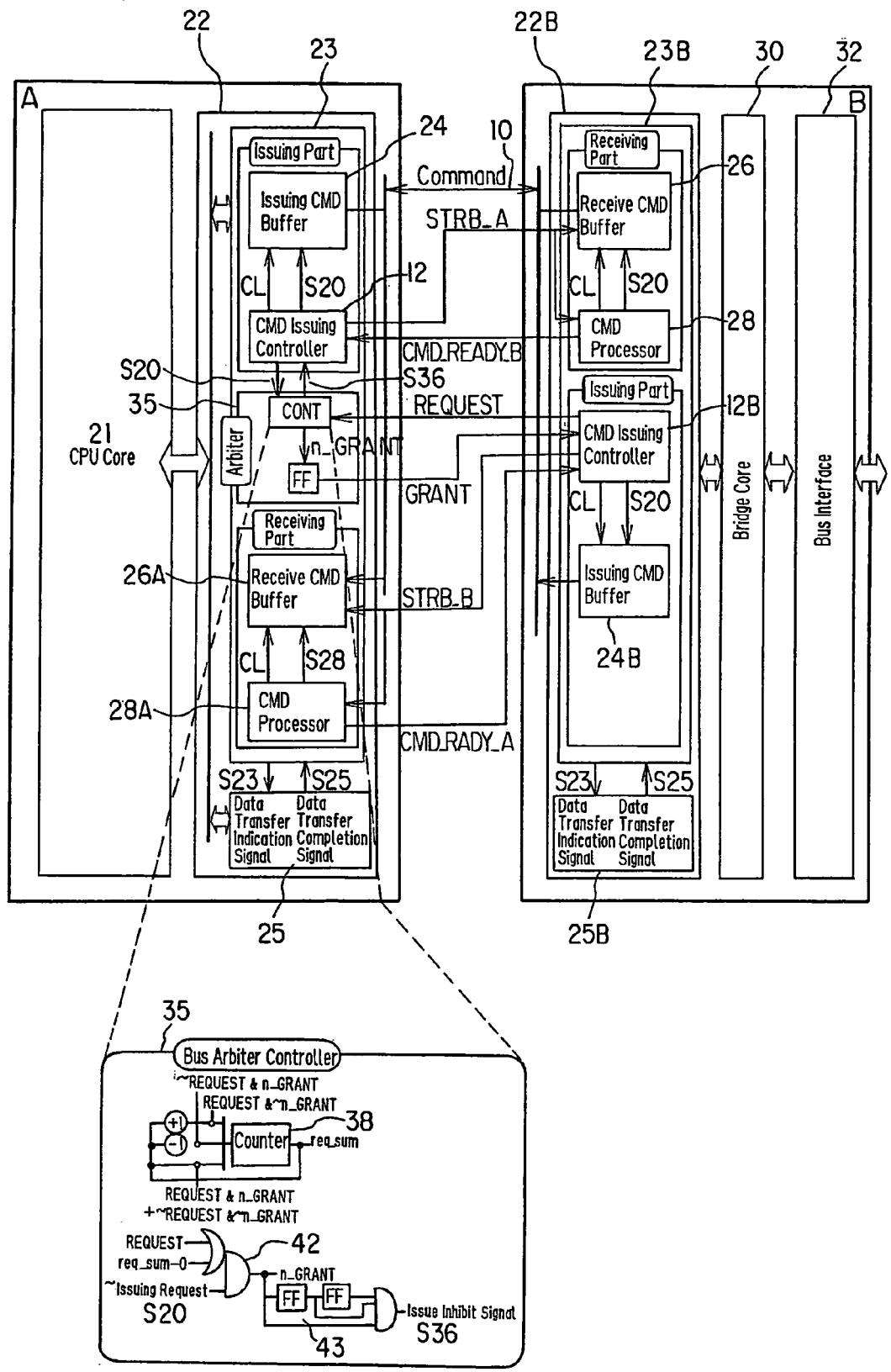
FIG. 6 is a detailed block diagram depicting the LSI in FIG. 5A.

FIG. 6 is a detailed block diagram of the LSI in FIG. 5A. The bus arbiter circuit 35 is provided in the command system control circuit 23 shown in FIG. 3.

As FIG. 6 shows, the bus arbiter circuit 35 along with the command issuing control circuit 12 shown in FIG. 2 are provided in chip A. The bus arbiter circuit 35 controls the bus access right to the bi-directional command bus 10, and the command issuing control circuit 12 controls commands at the chip B side. Therefore during the period when the command issuing control circuit 12 is inhibiting command issuing, the grant signal GRANT is issued responding to a request signal REQUEST, and the bus access right is given to the chip B.

In FIG. 6, the command issuing part and the receiving part are provided at the chip A side, and the command issuing part and the receiving part are also provided at the chip B side. The bus arbiter circuit 36 is provided only at the chip A side. Each command issuing part is comprised of an issuing command buffer 24 or 24B and a command issuing control part 12 or 12B, and each command receiving part is comprised of a receive command buffer 26 or 26A and a command processing part 28 or 28A. Each function is as described in FIG. 3.

[Data Issuing Control (Control of Data Buffer)]

The command issuing control and control of the access right to the bi-directional command bus were described above. The same controls can be applied to data. When the issuing side LSI issues data to the receiving side LSI, the issuing side LSI controls data volume that the receiving side LSI simultaneously received and controls the number of data stages, so that the bus access efficiency can be increased even at a high-speed frequency. In the case of the bi-directional command bus, a bus arbiter is required.

Figure 7A:
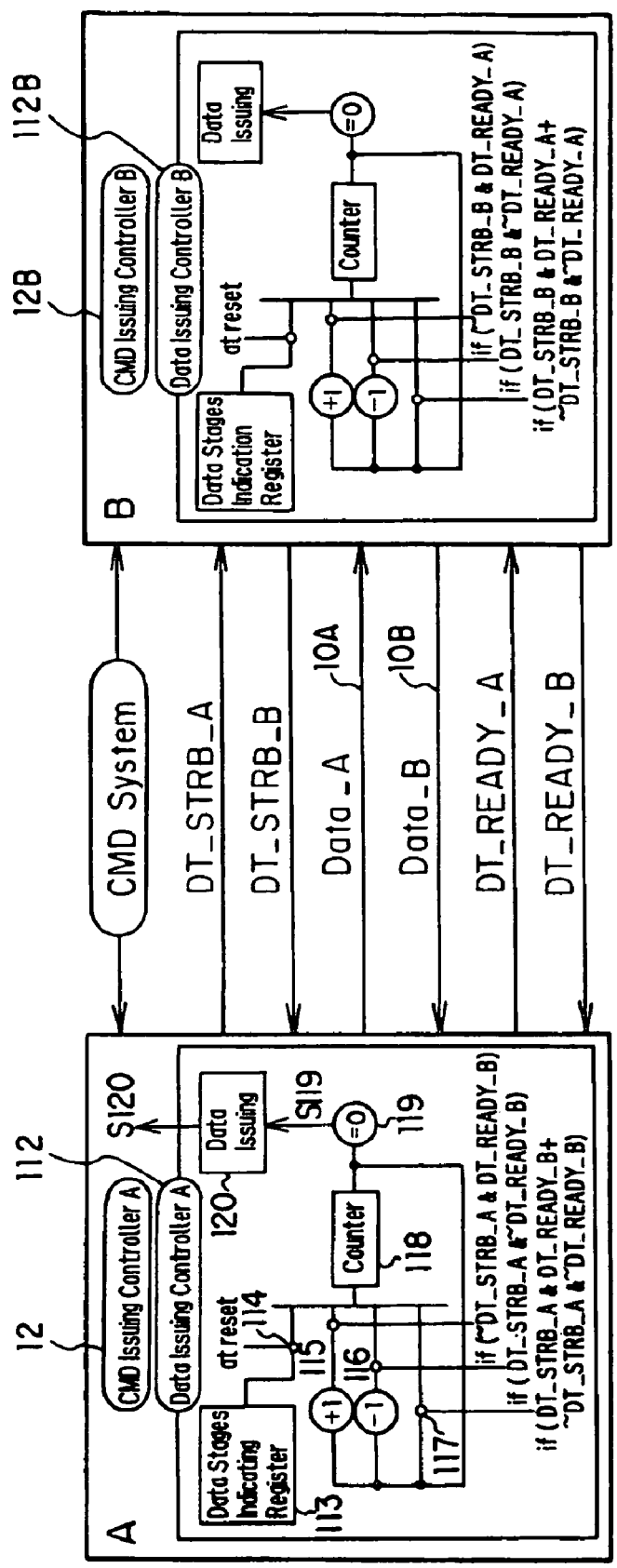
FIGS. 7A-7B are diagrams depicting the data issuing control according to the third embodiment.
Figure 7B:
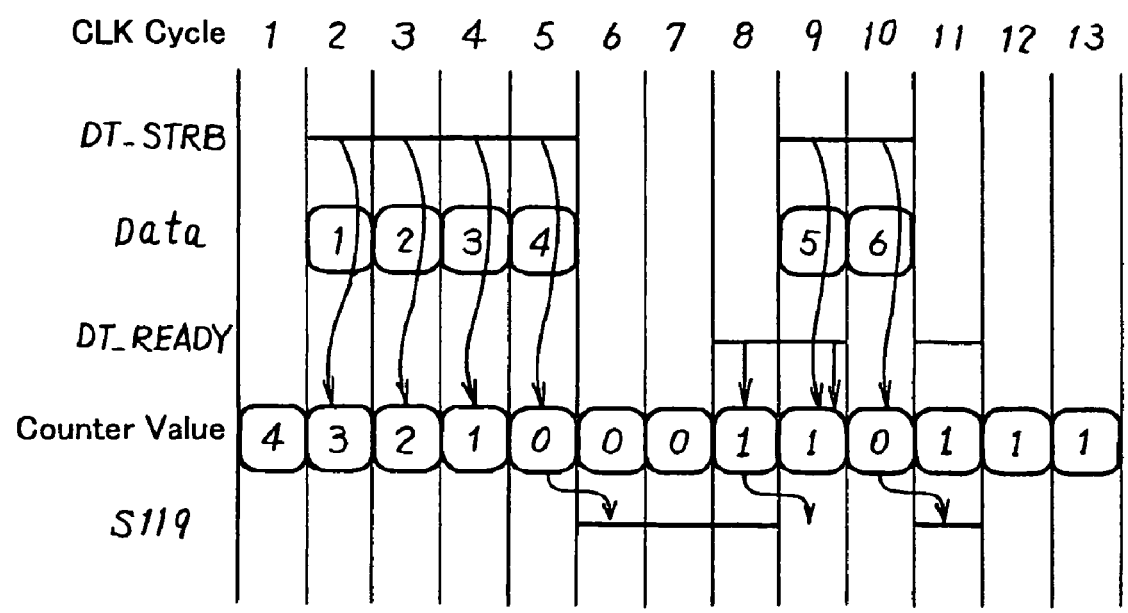

FIG. 7 are diagrams depicting the data issuing control according to the third embodiment. FIGS. 7A and 7B are diagrams corresponding to FIGS. 2C and 2B. In addition to the command issuing control circuit 12 shown in FIG. 2, the microprocessor A has a data issuing control circuit 112 with a similar configuration as the command issuing control circuit 12 as shown in the connection diagram in FIG. 7A. In the same way, in addition to the command issuing circuit 12B, the bridge chip B also has a data issuing control circuit 112B with a similar configuration as the command issuing circuit 12B.

This data issuing control circuit 112 is also comprised of a data stages indication register 113 which has information on the number of data stages of the data buffer which the chip B can simultaneously receive, a counter 118 where the number of data stages is set at reset, an issuing inhibiting signal generation circuit 119 which generates the data issuing inhibiting signal S119 when the counter value is "0", and a data issuing circuit 120 which generates a data issuing signal S120 when the data issuing inhibiting signal S119 has not been output. FIG. 7B shows the timing chart depicting this operation. This operation is the same as FIG. 2B.

Figure 8:
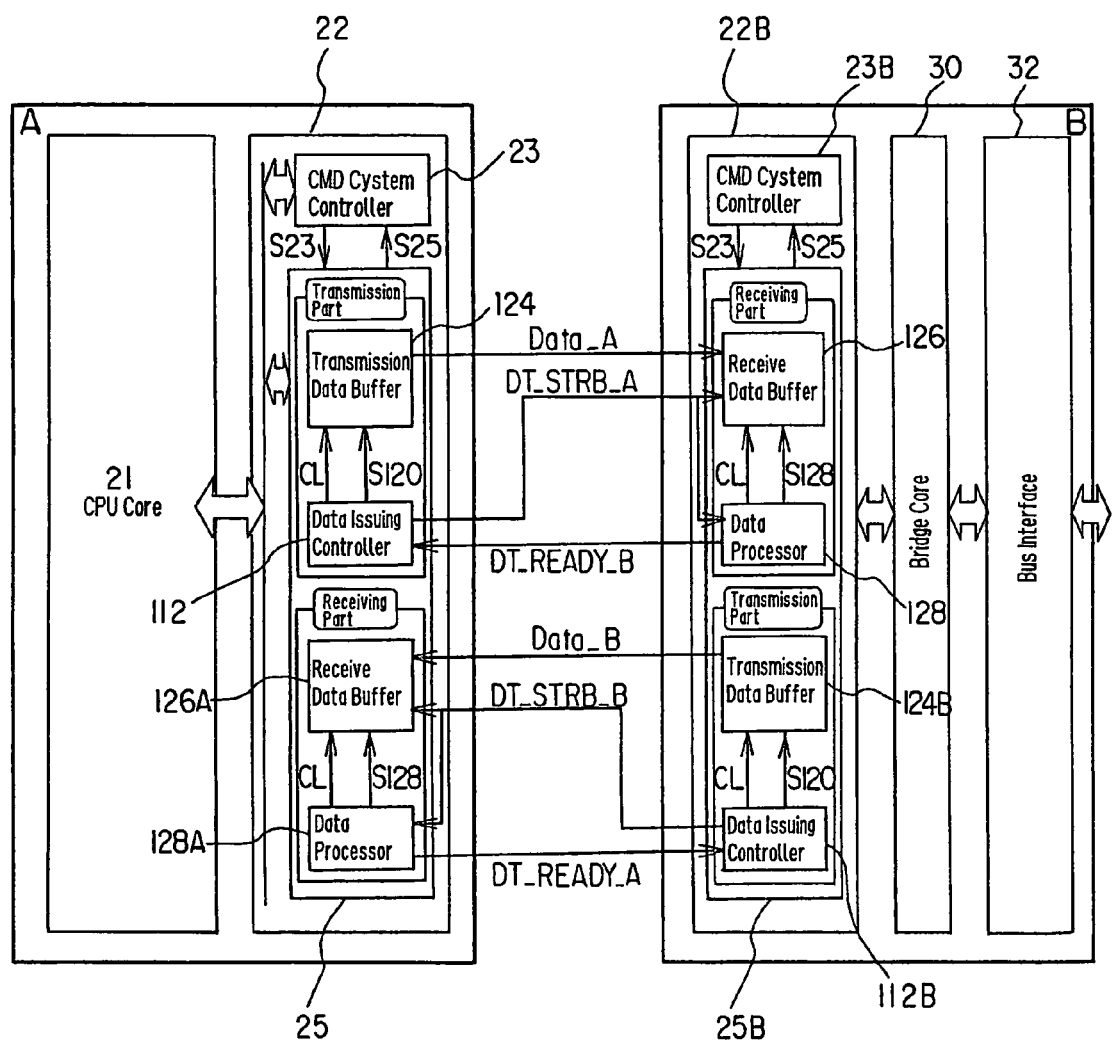
FIG. 8 is a detailed block diagram depicting the microprocessor and the bridge chip in FIG. 7.

FIG. 8 is a detailed configuration diagram of the microprocessor and the bridge chip in FIG. 7. FIG. 8 shows the data system control circuits 25 and 25B in addition to the command system control circuits 23 and 23B. The data system control circuit 25 at the chip A side has a data issuing control circuit 112, shown in FIG. 7, and a transmission data buffer 124 in the transmission part, and issues the data Data_A in the data buffer 124 responding to the issuing instruction signal S120 of the data issuing control circuit 112. At this time, the data issuing control circuit 112 asserts the data strobe signal DT_STRB_A at the same time. The receive data buffer 126 of the chip B receives and holds the issued data Data_A when the data strobe signal DT_STRB_A is asserted. And responding to the transfer instruction S128 of the data processing part 128, the receive data buffer 126 transfers the data Data_A to the bridge core 30 side. When the data processing part issues the data ready signal DT_READY_B at completion of the data processing, the data in the data buffer 126 is deleted.

A complete reversal of the above mentioned control is executed between the data system control part 25B of the chip B and the data system control part of the chip A.

[Control of Data Bus Access Right]

Figure 9:
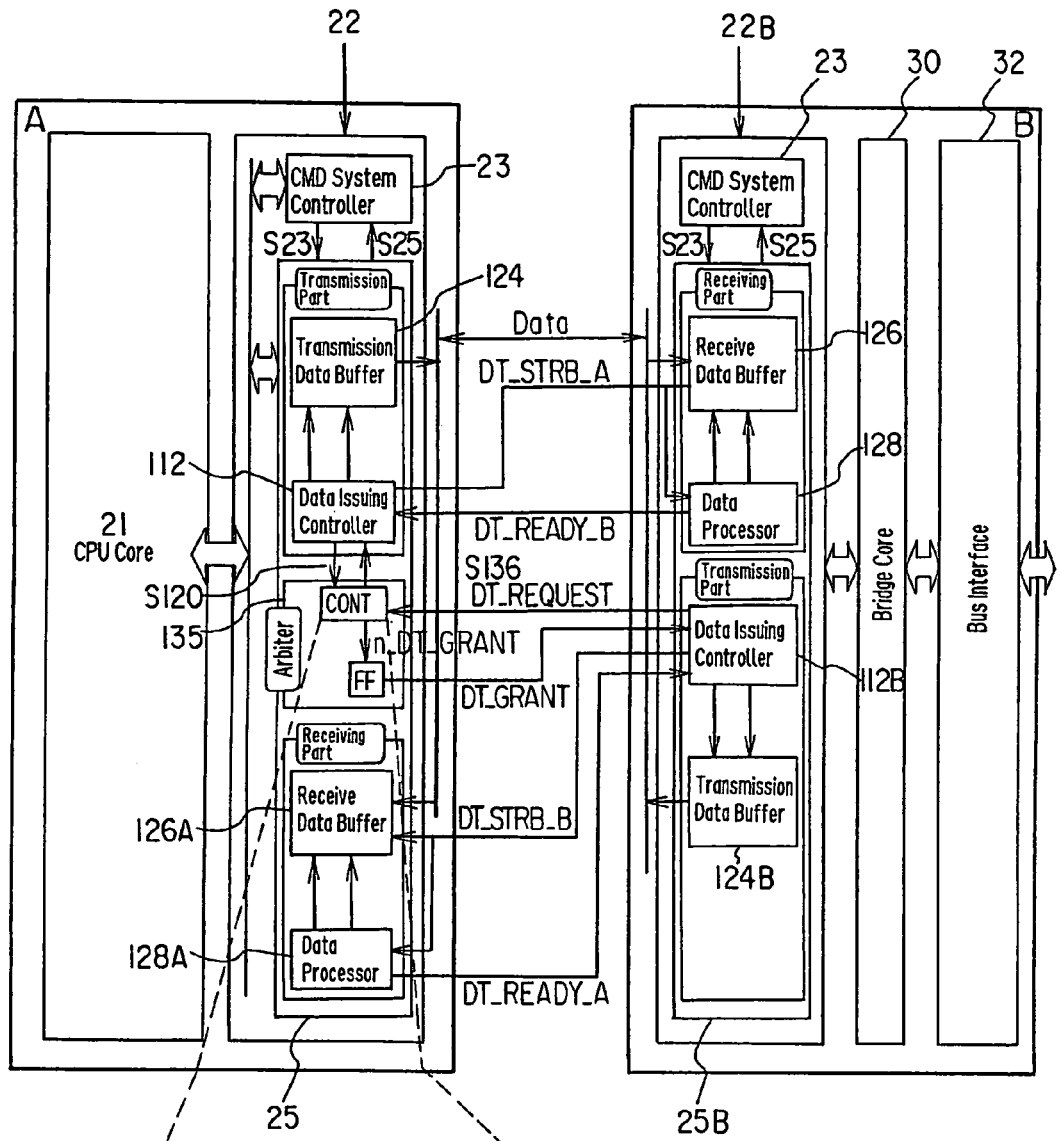
FIG. 9 is a diagram depicting the data bus control according to the fourth embodiment.

FIG. 9 is a diagram depicting the data bus control according to the fourth embodiment. In this example, the data bus Data is bi-directional. Therefore, a bus arbiter circuit 135 is provided in the bus control part 22 of chip A. This bus arbiter circuit 135 has the same configuration as the arbiter circuit 35 of the command bus shown in FIG. 3 and FIG. 6.

In other words, in the bus arbiter circuit 135, the counter 138 is incremented when the data request signal DT_REQUEST is issued from the chip B, and if the chip A issues the data grant signal DT_GRANT responding to this when the chip A is not going to issue data, the counter 138 is decremented. And when the counter value is not "0" and when the data issuing request S120 has not been output from the data issuing control circuit 112, the OR/AND gate 142 issues the grant signal GRANT, and supplies the issuing inhibiting signal S136 to the data issuing control circuit 112. In this way, the access right to the data bus is given to the chip B.

The operation of this data bus control is the same as the operation of the command bus control in FIG. 5B.

Figure 10:
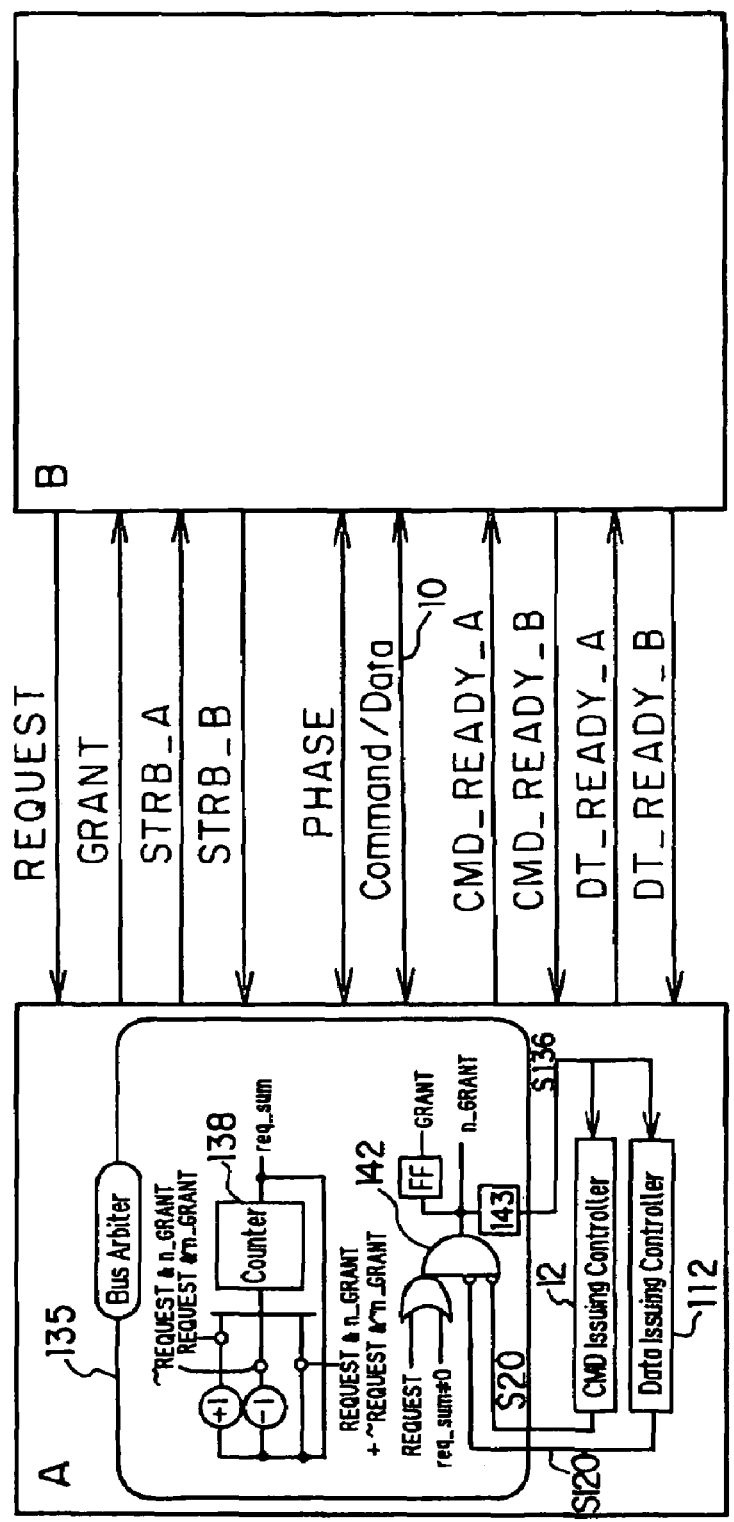
FIG. 10 is a connection diagram depicting an example when a command and data are transferred using a common bus.

FIG. 10 is a block diagram where the chip A and the chip B share the bi-directional command bus and the data bus. Bus 10 is a bus where the command and the data are bi-directionally transferred. Along with this, the request signal REQUEST, the grant signal GRANT, and the strobe signals STRB_A and B are also shared by the data and the command. When the chip A issues a command or data to the chip B, the strobe signal STRB_A is asserted, and when the chip B issues a command or data to the chip A, the strobe signal STRB_B is asserted. For mutual control of the receive command buffer and the receive data buffer, the command ready signals CMD_READY_A and B and the data ready signals DT_READY_A and B are issued. And for the bus right control for the bi-directional bus, the chip B issues the request signal REQUEST, and the chip A issues the grant signal GRANT.

The bus arbiter circuit 135 in the chip A is the same as the arbiter circuit shown in FIG. 9, but when the grant signal GRANT is issued, the issuing inhibiting signal S136 is sent to both the command issuing control circuit 12 and the data issuing control circuit 112. Also, the issuing request signal S20 from the command issuing control circuit 12 and the issuing request signal S120 from the data issuing control circuit 112 are sent to the gate 142, and the grant signal GRANT is issued when both of these issuing request signals are not output.

In the example in FIG. 10, the command and the data are issued to the same bus, so a phase signal PHASE, to indicate whether the command or data signal, is added. The chip which issues the command or the data issues this phase signal along with the strobe signal. According to this phase signal, the chip at the receiving side stores the command or the data in the corresponding receive buffer.

[Data Access Type]

FIG. 11 are connection diagrams of examples when the access type signal is added to the data according to the fifth embodiment. The microprocessor in accordance with the present patent application issues a plurality of commands to the bridge chip without receiving confirmation on the corresponding processing. Commands are issued, however, only until the receive command buffer of the bridge chip at the receiving side becomes full. Also the microprocessor issues a plurality of data to the chip at the receiving side until the data buffer at the receiving side becomes full.

In the examples shown in FIGS. 7, 8, 9 and 10, when the data is transferred via the data bus, the data and command correspondence is not indicated. Therefore it is a tacit rule that data is output to the data bus in the sequence of the corresponding commands which are issued to the command bus.

For example, it is assumed that commands are issued in the sequence of the read command from the chip A to the chip B, and the write command from the chip B to the chip A. In this case, the data transfer direction is from the chip B to the chip A for both commands, but the chip A requires data to be transferred in the sequence of commands, that is, the sequence of the reply data of the read command and the write data of the write command, in order to latch data to be transferred from the chip B correctly. The chip B side, however, may take time to prepare the data for the read command from the chip A, since the chip B must issue a command to another LSI and wait for that reply in some cases. For write data, on the other hand, data is normally ready in the chip B when the chip B issues the write command to the chip A, so it is a waste of time to wait until data for the read command, which was issued first, is prepared.

Figure 12A:
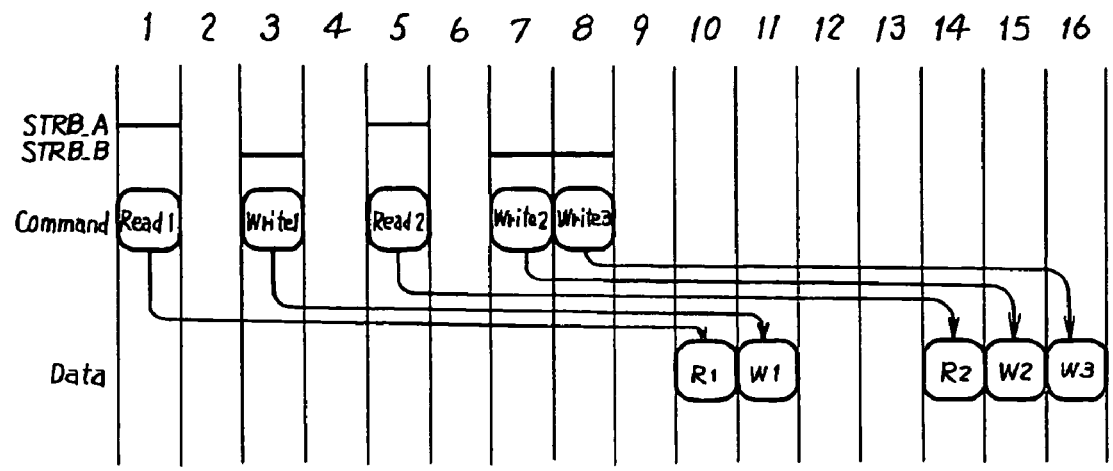
FIGS. 12A-12B are timing charts depicting the operation of the fifth embodiment.

FIG. 12A is an operation timing chart thereof. These are examples when the chip A issues read commands to the chip B and the chip B issues write commands to the chip A respectively, and in this case, both the read data which responds to the read command and the write data which is attached to the write command, are transferred from the chip B to the chip A. Therefore, conventionally corresponding data are transferred in the sequence of the issuing commands, since it cannot be distinguished whether the data is read data or write data.

According to conventional methods, the chip A issues the read commands Read 1 and 2 at the cycles 1 and 5, and the chip B issues the write commands Write 1, 2 and 3 to the chip A at the cycles 3, 7 and 8, as shown in FIG. 12A. The chip B attempts to transfer the write data W1 at the cycle 3 responding to the write command Write 1, but this transfer is disabled since the read reply data R1, corresponding to the previously issued read command Read 1, is not ready. Finally at the cycle 11, the chip B transfers the write data W1 to the chip A after the read reply data R1 is transferred. The write data W2 and W3, corresponding to the write commands Write 2 and 3, are also transferred after the read reply data R2 is transferred from the chip B at the cycle 14. As a result, data transfer for a write command delays and processing efficiency drops.

Figure 11A:
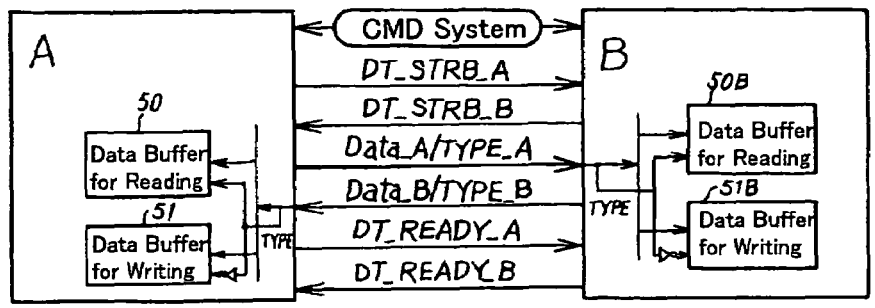
FIGS. 11A-11C are connection diagrams depicting an example when an access type signal is added to the data according to the fifth embodiment.

With the foregoing in view, in the present embodiment, an access type signal TYPE, which indicates whether data DATA being transferred is read reply data or write data, is added as a data bus signal, as shown in FIG. 11A. Conventionally, data must be transferred in the sequence of the issuing commands, but in this embodiment, the data transfer sequence can be adhered to only within the group of read commands or only within the group of write commands because of this access type signal. In other words, read reply data for the read commands are transferred in the sequence of the issuing of the read commands, and the write data for the write commands are transferred in the sequence of the issuing of the write commands. However, if the access type signal is attached to the data, the restrictions in the sequence between read and write can be eliminated.

Figure 12B:
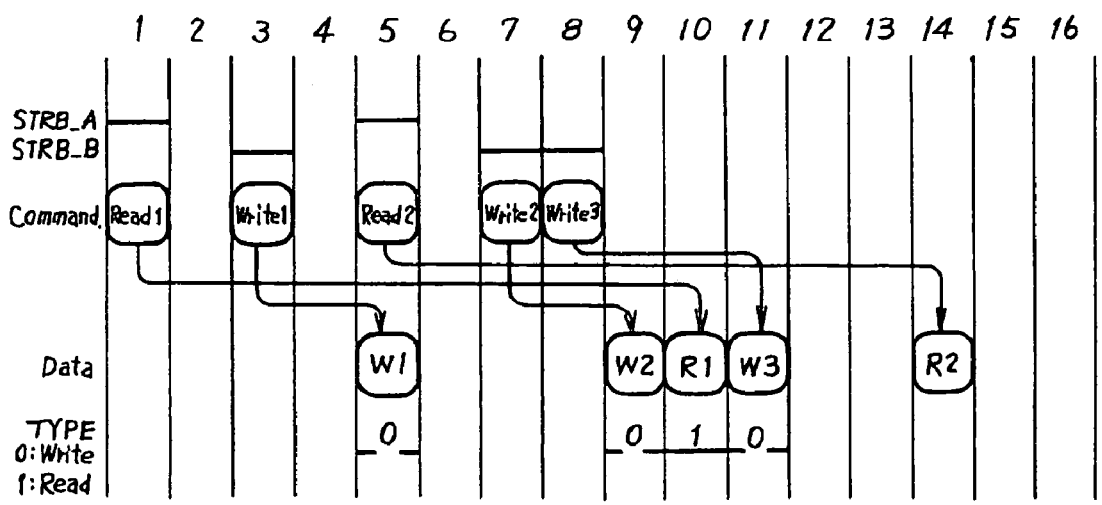

FIG. 12B shows an example when the above mentioned access type signal TYPE is added. The access type signal TYPE "0" indicates write data, and "1" indicates read reply data. Also in this example, the read command is issued from the chip A to the chip B, and the write command is issued from the chip B to the chip A, just like FIG. 12A. And, the write data W1, corresponding to the write command Write 1 issued at the cycle 3, is issued from the chip B to the chip A at the cycle 5 along with the access type signal TYPE=0. In the same way, the write data W2 and W3 for the write commands Write 2 and 3 issued at the cycles 7 and 8 are issued from the chip B respectively at the cycles 9 and 11. As a result, the write data is issued without waiting for the issuing of the read reply data, so the processing efficiency for a write command can be increased. And as the transfer of the write data becomes faster and the processing of the write command also becomes faster, the area of the receive command buffer is released sooner, the next command can be issued sooner, and the bus efficiency can be improved.

As FIG. 11A shows, each chip has a data buffer for reading 50 or 50B and a data buffer for writing 51 or 51B as a data buffer for reception, and data in the data buffer is distributed according to the type signal TYPE which is supplied at the same time.

Figure 11B:
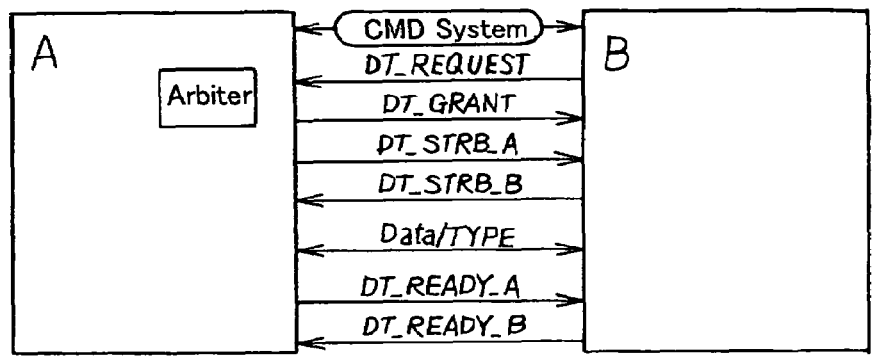

FIG. 11B is an example when the data bus Data is a bi-directional bus which is shared by the chip A and the chip B. Also in this case, an access type signal is attached to the data bus, but a bus arbiter circuit is provided at the chip A side to control the access right to the data bus. This bus arbiter is as described above.

Figure 11C:
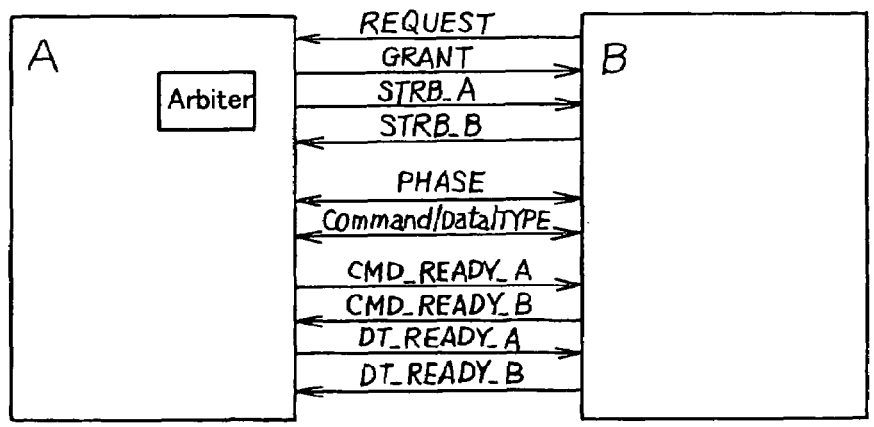

FIG. 11C is an example when the command bus and the data bus are shared and bi-directional. Also in this case, an access type signal is added to the buses, and just like in FIG. 10, a phase signal PHASE is added in order to add information on whether a command or data is issued to the bus.

[Default Bus Master]

In the examples shown in FIGS. 9, 10 and 11, the arbiter circuit for controlling the bus access right is at the chip A side for both the command bus and the data bus, and the chip A can access the command bus or the data bus immediately if the bus is open, but the chip B cannot access these buses unless the chip B outputs the request signal to the chip A and receives the grant signal each time.

For example, when the chip A is a microprocessor, such as a CPU, and the chip B is a bridge LSI, the reply to a read command issued by the microprocessor A must be as quick as possible in order to improve the performance of the entire chipset.

In the above example, the microprocessor A can immediately issue a command to the bridge chip B without overhead, but the bridge chip B cannot transfer the read reply data to the microprocessor A unless the bridge chip B outputs a request to the data bus and receives a grant signal in response. So, for the bridge chip B, overhead occurs when data is transferred.

Figure 13:
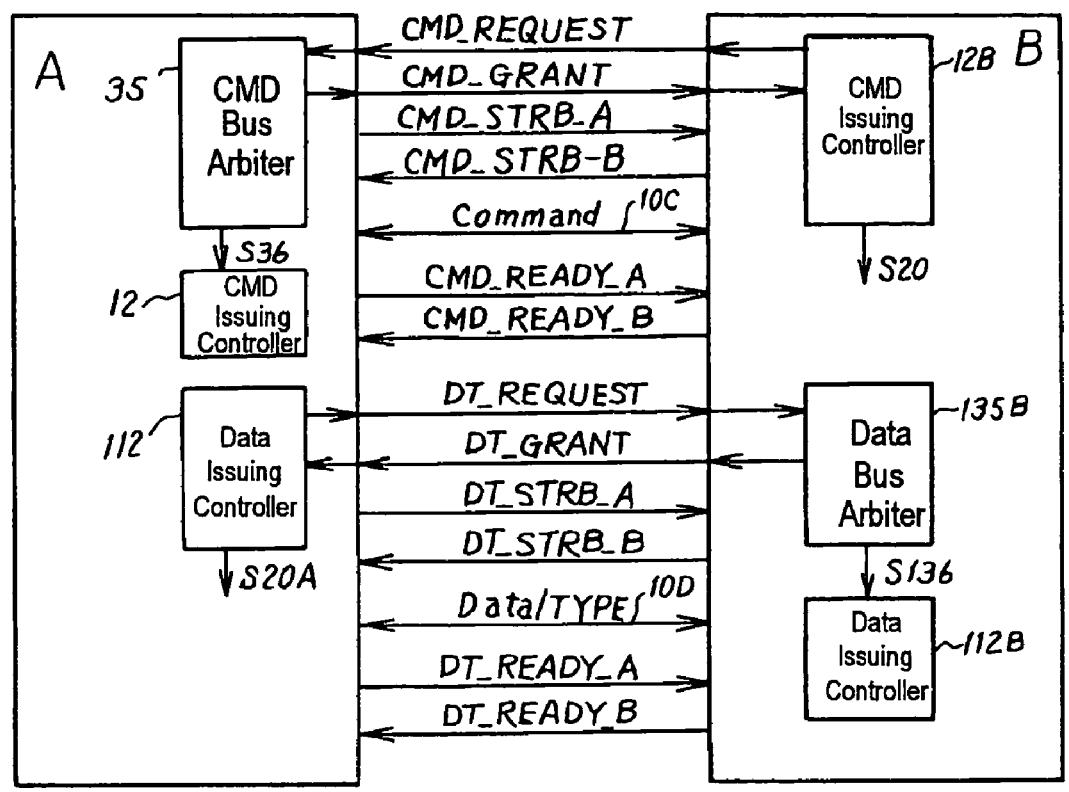
FIG. 13 is a connection diagram depicting an example when the chips have priority over each other for the command bus and the data bus according to the sixth embodiment.

FIG. 13 is a connection diagram of an example when the command bus and the data bus of the chipset has priority over each other according to the sixth embodiment. FIG. 13 does not show a detailed configuration. But the configurations of the chips A and B can be understood by referring to the above mentioned detailed block diagrams.

As FIG. 13 shows, according to the present embodiment, a command bus arbiter circuit 35 is provided in the chip A, the chip A has the priority to access the command bus 10C, a data bus arbiter circuit 135B is provided in the chip B, and the chip B has priority to access the data bus 10D. In other words, the default bus master (LSI which normally has the bus access right) of the command bus 10C is set to the chip A, and the default bus master of the data bus 10D is set to the chip B, so that the read command, which the microprocessor A issued to the bridge chip B, can be processed without overhead for arbitration for the bus access right during both command issuing and data transfer.

When a read command is issued from the bridge LSI to the CPU, arbitration is required for both command issuing and data transfer, but such an access, which is rare, has almost no influence on performance. In this case, responding to a command request from the command issuing control part 12B of the chip B, the command bus arbiter 35 of the chip A issues a command grant signal when the chip A does not issue a command, and outputs the issuing inhibiting signal S36 to the command issuing control circuit 12. The command issuing control circuit 12B of the chip B, on the other hand, outputs the command issuing signal S20 to the command transmission buffer, which is not illustrated, responding to the command grant signal.

Responding to the data request from the data issuing control part 112 of the chip A, the data bus arbiter 135B of the chip B issues the data grant signal when the chip B does not issue data, and outputs the issuing inhibiting signal S136 to the data issuing control circuit 112B. The data issuing control circuit 112 of the chip A, on the other hand, outputs the data issuing signal S20A to the data transmission buffer, which is not illustrated, responding to the data grant signal.

[Burst Transfer of Data Bus (Bus Access Period Control)]

For data transfer between LSIs, a burst transfer to continuously transfer collective data is required, unlike the case of a command. To implement a burst transfer, control of the bus access period for a plurality of cycles is required, in addition to the control of the bus access right. Also data buffer control at the receiving side, which is mentioned later, is necessary.

Figure 14:
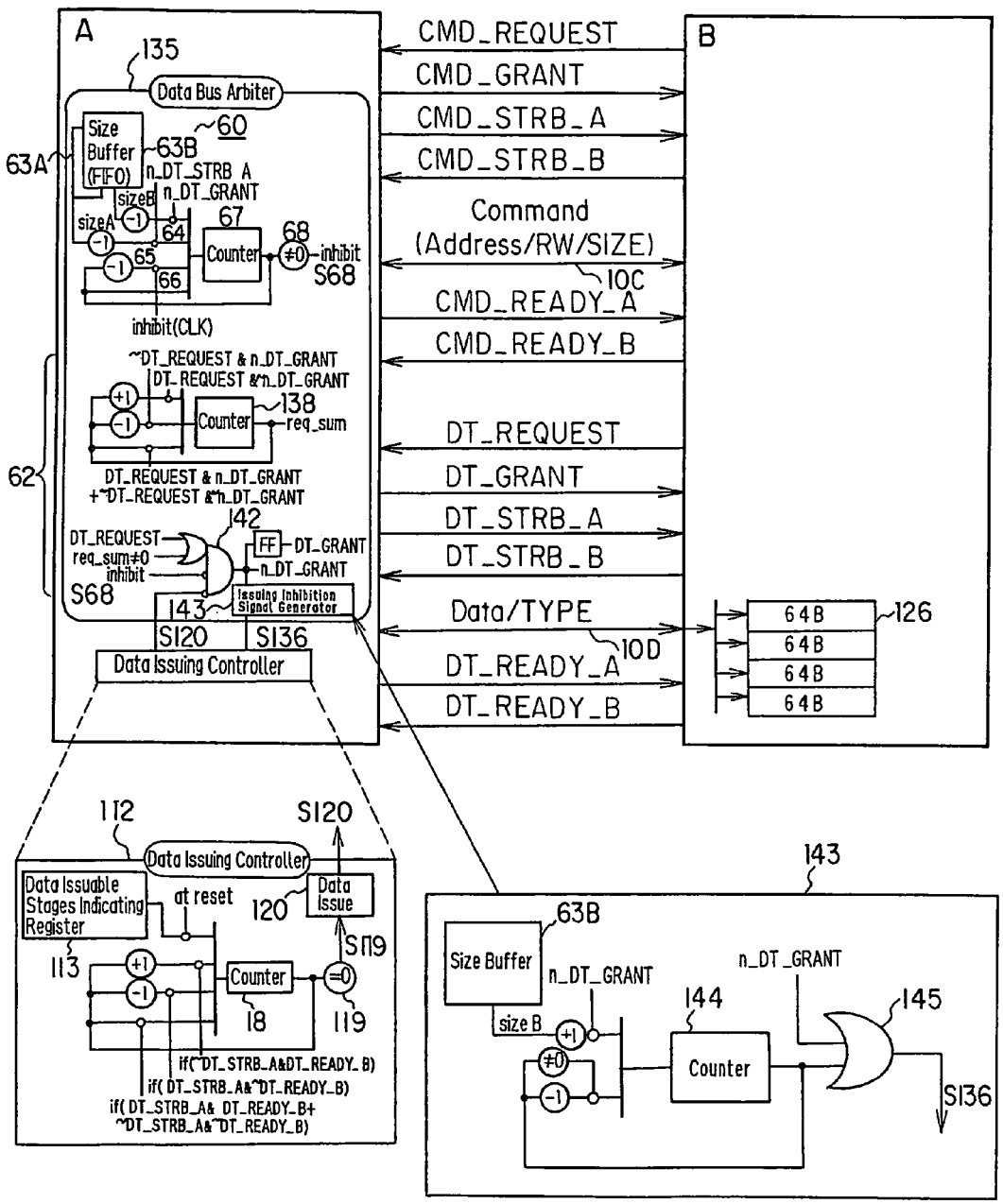
FIG. 14 is a block diagram depicting a bus arbiter which performs bus access right control at a burst transfer according to the seventh embodiment.

FIG. 14 is a block diagram of a bus arbiter to perform bus access right control during a burst transfer according to the seventh embodiment. In this example, a size signal SIZE is added to the command bus 10C to perform a burst transfer. Other than this, the bus, the control signals and the control circuit have the same configuration as those shown in FIG. 6, and the bus, the control signals and the control circuit of the data system have the same configuration as those shown in FIG. 9. The data type signal TYPE shown in FIG. 11B is added to the data bus 10D, so that information distinguishing between read and write is added to the data to be transferred.

In the case of the bi-directional data bus 10D, the bus access right must be controlled by the bus arbiter circuit 135, as mentioned above. The bus arbiter circuit 135 is provided at the chip A side, the chip A side has the bus access right by default, and if the chip B must issue data to the data bus, the chip B issues a data request signal DT_REQUEST as an issuing request, receives the data grant signal DT_GRANT from the bus arbiter 135, then the chip B transfers the data. To perform a burst transfer in this case, the bus access right must be continued for the cycles which have the burst length which is calculated by dividing the transfer data size by the bus width. This becomes the bus access period. In the same way, such bus access period control is also required in the case of a burst transfer from the chip A to the chip B. Arbitration of the bus access right, however, is unnecessary in this case.

The data bus arbiter 135 has a bus access period control circuit 60 in addition to the bus access right control circuit 62, described for the data bus control in FIG. 9. This bus access period control circuit 60 is comprised of a size buffer 63 for recording the size signal SIZE which was added to the command at a burst transfer, a burst counter 67 for loading the size at the start of a burst transfer, and an inhibiting signal generation circuit 68 for outputting the inhibiting signal S68 while the counter value is not "0". The size buffer 63 further comprises a buffer 63B for recording the burst transfer size from the chip B and a buffer 63A for recording the burst transfer size from the chip A.

The burst size (or data size/bus width) size B from the chip B is decremented "−1" and loaded to the burst counter 67 via the switch 64 when the pre-signal n_DT_GRANT of the data grant signal is issued. And from the next clock cycle, the counter value is decremented by the switch 66 synchronizing with the clock CLK while the inhibiting signal S68 is being output. When the data transfer for the burst size completes, the burst counter 67 becomes "0" and the inhibiting signal S68 stops.

The burst size size A from the chip A is decremented "−1" and loaded to the burst counter 67 via the switch 65 when the pre-signal n_DT_STRB_A of the data strobe signal is issued. The decrement operation of the counter thereafter is the same as above.

During this burst transfer period, the inhibiting signal S68 is also output to the OR/AND gate 142 of the bus access right control circuit 62 to continue the bus access right. Therefore while the inhibiting signal S68 is generated, the generation of the data grant signal DT_GRANT is inhibited. The issuing inhibiting signal S136 is generated as follows by the issuing inhibition signal generation circuit 143. At first, the size B value from the size buffer 63B is incremented "+1", and is loaded to the counter 144 at a timing when the pre-signal n_DT_GRANT is valid. The counter 144 is decremented at each cycle until the value becomes "0". The issuing inhibiting signal S136 is output from the NOR gate 145 at a cycle where the counter value is not "0" and at a cycle where the pre-signal n_DT_GRANT is valid. The rest of bus arbitration is the same as the example in FIG. 9.

Figure 15:
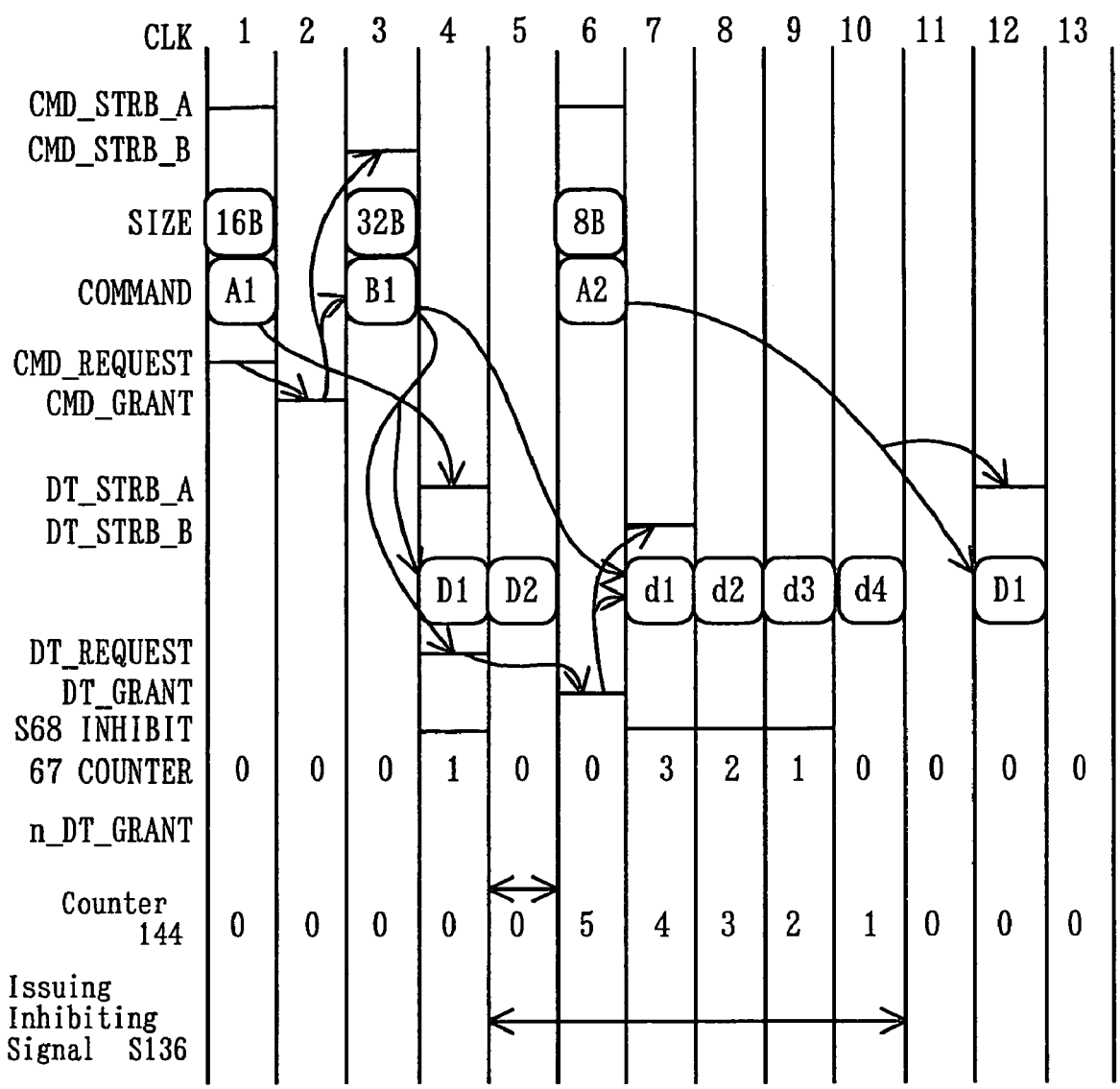
FIG. 15 is a timing chart depicting the operation of the seventh embodiment.

FIG. 15 is a timing chart depicting the operation of the seventh embodiment. In this example, the chip A outputs the command A1 at the cycle 1. At the same time, the chip A outputs the size signal SIZE. This data size is 16B (byte), but since the data bus width is 8B (8 bytes=64 bits), the burst size of the data corresponding to the command is 2, which requires two cycles. At the cycle 3, the chip B outputs the command B1. The size at this time is 32B. Then the chip A outputs the 8B size command A2 at the cycle 6. The above commands are all write commands.

The data bus 10D outputs data D1 and D2 corresponding to the first command A1 during two cycles from the cycle 4 to the cycle 5. The chip B outputs the data request signal DT_REQUEST at the cycle 4, but the chip A is outputting the data and the inhibiting signal S68 is being generated, so the chip A outputs the data grant signal DT_GRANT at the cycle 6, which is one cycle later. Responding to this, the chip B outputs data d1-d4 during four cycles from the next cycle 7. The inhibiting signal S68 is generated until the cycle where the second data from the last is output. The chip A cannot immediately output data corresponding to the command A2 since the chip B is using the data bus. To the counter 144 of the issuing inhibiting signal generation circuit 143, a value (=5), when 1 is added to the burst length 4 of the data of the chip B, is loaded at the cycle 6 by the pre-signal n_DT_GRANT at the cycle 5. This counter 144 is decremented at each cycle, and becomes "0" at the cycle 11. The issuing inhibiting signal S136 is output during six cycles, from the cycle 5 where the pre-signal n_DT_GRANT is valid, to the cycle 10, which is just before the counter value becomes "0". The chip A outputs the data D1 corresponding to the command A2 at the cycle 12, which is the next cycle of the cycle 11 where the issuing inhibiting signal is negated.

By outputting the size signal SIZE which indicates that the data size is output simultaneously with a command, as described above, the bus access right can be maintained during a burst transfer, which enables the burst transfer.

[Receive Data Buffer Control During Burst Transfer]

Making a burst transfer possible means that the data volume of a data transfer changes each time. Therefore it is necessary to consider the control of the receive data buffer at the receiving chip side. The simplest method is to set a maximum data size of the data transfer for one command, regardless the burst length, creating a plurality of stages of the receive data buffers having the set size, and controlling the receive data buffer by the number of data stages, as described in FIG. 7. This is the first receive data buffer control method.

For example, the upper limit of the size of one burst transfer is set to 64 bytes. If the bus width of the data bus is 8 bytes (64 bits), then the maximum burst length is 8 cycles. In this case, the receive data buffer 126 is configured into a plurality of stages (4 stages in FIG. 14) in 64 byte units, as shown in the chip B in FIG. 14. And a data transfer for one command is stored in each buffer. In other words, data is allocated and saved in the receive data buffer 126 in each stage, regardless whether it is a single data transfer or a burst transfer.

In this case, the receive data buffer can be controlled by the data issuing control circuit 112 shown in FIG. 14. This data issuing control circuit 112 has the same configuration as the control circuit in FIG. 7. In other words, the number of stages of the receive data buffer 126 is stored in the register 113, and is loaded to the data stages counter 18 at reset. Then the counter is decremented at each data transfer by issuing the data strobe signal, and the counter is incremented each time the data ready signal is received at the completion of processing of the transferred data. When all four stages of the receive data buffer 126 are used, issuing of data is inhibited thereafter. Control is the same whether a burst transfer is executed or not.

Data transfer from the chip A to the chip B and transfer from the chip B to the chip A can be implemented by the same mechanism.

Now the second receive data buffer control method will be described. In the case of the above mentioned first receive data buffer control method, 64 bytes of the data buffer is used to transfer even 1 byte data, so the use efficiency of the receive data buffer is poor. As a method to improve this, the second control method where the receive data buffer is controlled in byte units according to the data size to be transferred will be described with reference to the block diagram and the operation time chart in FIG. 16.

Figure 16A:
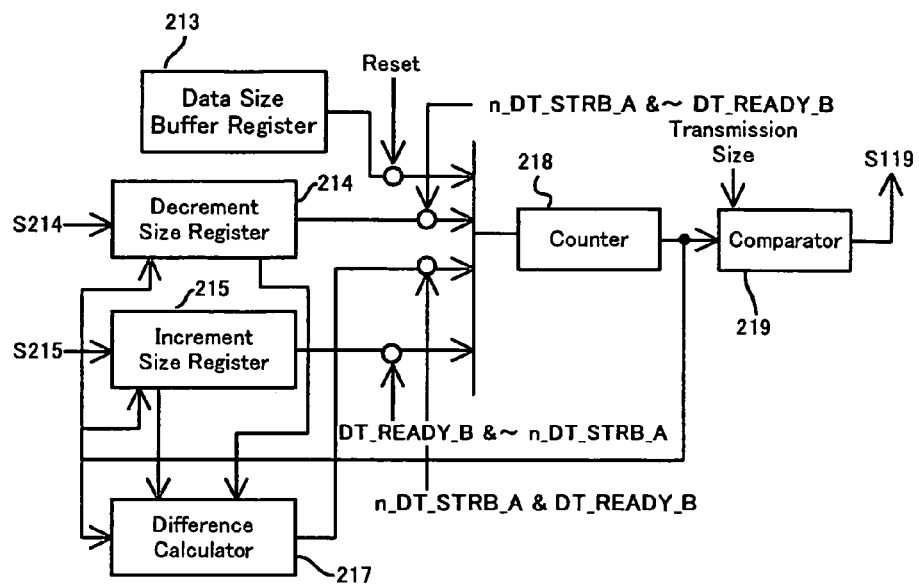
FIGS. 16A-16B are diagrams depicting a second receive data buffer control method.

FIG. 16A is a block diagram of the data issuing control circuit 112. This circuit is disposed in chip A, instead of the data issuing control circuit shown in FIG. 14. The size of the receive data buffer at the chip B side is stored in the data buffer size register 213, and is loaded to the counter 218 at reset. The transmission size S214 of the data is stored in the decrement size register 214 each time data is transferred, and the size is decremented from the counter 218. The data size S215 for which processing ended is incremented to the counter 218 each time the data ready signal DT_READY_B is received from the chip B. When the pre-signal n_DT_STRB_A and the data ready signal DT_READY_B simultaneously become valid, (the current counter value−decrement size+increment size) is calculated by the difference calculator 217, and is stored in the counter 218. In other words, the counter 218 indicates the remaining size of the receive data buffer of the chip B. Then the counter size is compared with the transmission size by the comparison circuit 219, and the issuing inhibiting signal S119 is generated when the transmission size is greater than the size of counter 218. As long as the transmission size is smaller than the counter size, data transfer is enabled since the receive data buffer has an open area. By this method, the receive data buffer can be effectively used.

Figure 16B:
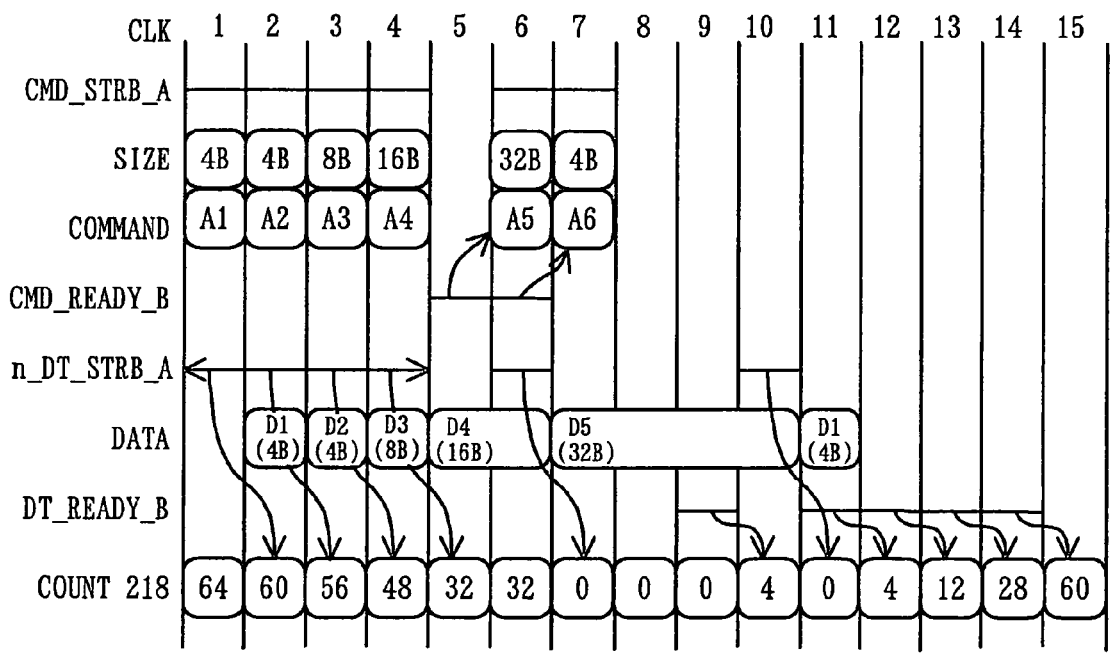

FIG. 16B is a timing chart depicting an example of this operation. For example, the chip A outputs the 4B size command A1 at the cycle 1, the 4B size command A2 at the cycle 2, the 8B size command A3 at the cycle 3, and the 16B size command A4 at the cycle 4, to the command bus 10D. Since the command buffer has four stages, the command buffer at the chip B side is supposedly full at this stage, but in this example, the chip B completes processing of the first command, and outputs the command ready signal CMD_READY_B at the cycle 5. As a result, the chip A outputs the 32B size command A5 at the cycle 6.

In this case, the receive data buffer is controlled not by the number of stages but by the data volume according to the present embodiment. Since the total of transfer data from the commands A1 to A4 is 32B, 32B is open in the receive data buffer having 64B, as the counter 218 indicates. Therefore the burst transfer of the data D5 corresponding to the command A5 is executed during four burst cycles from the cycle 7. As a result, the counter value reaches "0", and the data transfer thereafter is inhibited. Then, after the data ready signal DT_READY_B is output at the cycle 9, the counter value recovers to 4B, and the data D1 corresponding to the command A6 is transferred at the cycle 11.

By this second data buffer control method, even a receive data buffer with small capacity can be used effectively. This data issuing control circuit can be provided at the chip B side as well.

Now the third receive data buffer control method will be described. In the case of the above mentioned second receive data buffer control method, if a 4 byte size or a 2 byte size command is issued, the receive data buffer must be controlled with that size, which makes control for storing data to the buffer complicated. In the case of the third receive data buffer control method, the unit to control the receive data buffer is the burst length so as to simplify this control.

Figure 17A:
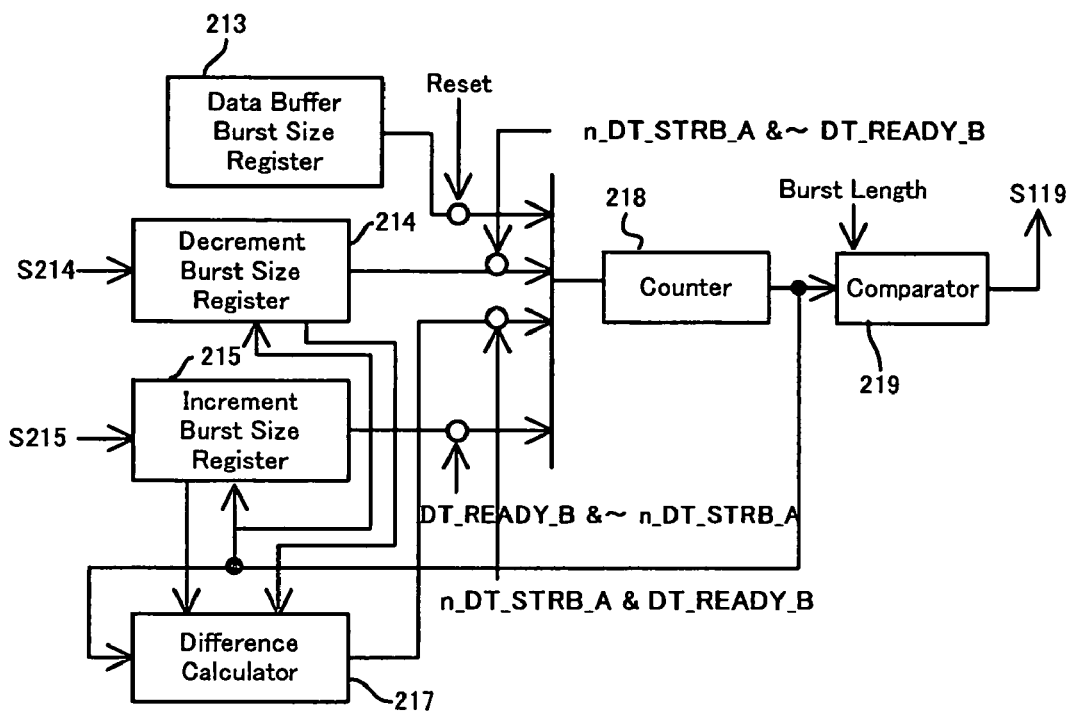
FIGS. 17A-17B are diagrams depicting a third receive data buffer control method.
Figure 17B:
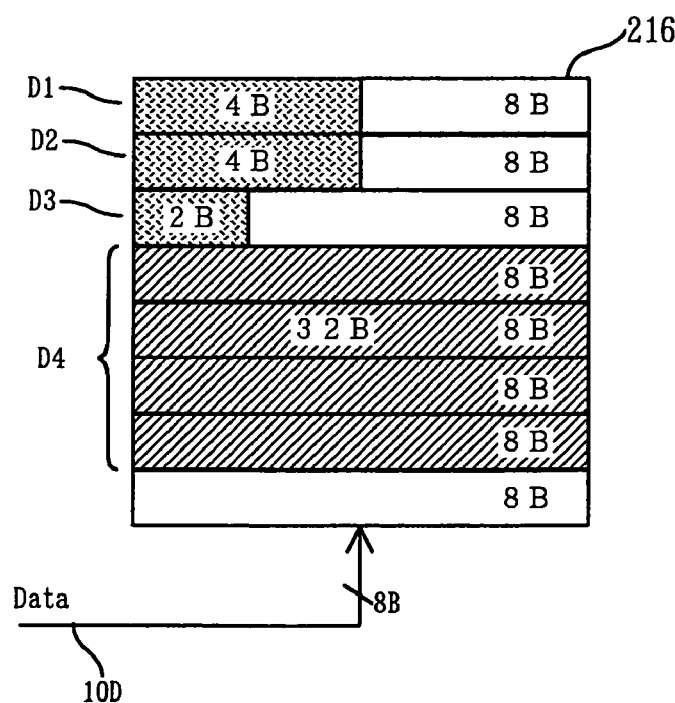

FIG. 17 are diagrams depicting the third receive data buffer control method. FIG. 17A shows the receive data buffer control circuit, and FIG. 17B shows the receive data buffer. The size and data bus width of the receive data buffer 216 of the chip B are assumed to be 64 bytes and 8 bytes respectively, for example. To the counter 218 of the data issuing control circuit 112 of the chip A, the burst size when the receive data buffer size 64B is divided by the bus width 8B, that is, 64/8=8 in this case, is loaded at initialization. When data is transferred, the value when the transfer data size is divided by the bus width, that is, the transfer burst length S214 (number of cycles required for the data transfer), is decremented from counter value in the counter 218. Even when the size is less than the data bus width (8B), such as 2 or 4 bytes, the burst length is "1" and the counter is decremented by "1". When the data ready signal DT_READY_B is input from the chip B, the corresponding burst length S215 is incremented from the counter value in the counter 218. To transfer data, the burst length and the counter value are compared, and the data is output if the counter value equals the burst length or more. If the counter value is smaller than the burst length, the output of the data is inhibited by the data issuing inhibiting signal S119 until the data ready signal DT_READY_B is input, and the counter value exceeds the burst length.

FIG. 17B shows an example of the receive data buffer 216 access status. This is an example when 4B data D1 was transferred first, then 4B data D2, 2B data D3, and finally 32B data D4 was transferred. Initially the data D1, D2 and D3 use each 8B area of the receive data buffer 216 respectively. And the final data D4 uses four stages of the 8B area. Since the data bus width 8B and the buffer size 8B in each stage match, control for storing data to the data buffer is simplified.

According to this third method, data buffer access efficiency is somewhat lower than the second method where the data buffer is controlled by the transfer data volume, but control of the receive data buffer is very simple since data need not be rearranged when the data, which size is smaller than the bus width, is to be transferred.

Now the fourth receive data buffer control method will be described. According to the above mentioned third method, when a data ready signal is received, the counter 218 is incremented for the value of the data transfer size S215 corresponding to the data ready signal. Therefore in this method, the transfer size must be stored.

So according to the fourth receive data buffer control method, the data receiving side (the chip B) does not output the data ready signal only once for one data transfer, but outputs the data ready signals for the burst length times for one data transfer. The counter in the data issuing control circuit increments the burst length +1 responding to the data ready signal. By this, the size at the data transfer need not be stored, which simplifies control.

According to the fourth method, the counter 218 is decremented for the value of the burst length S214 at the data transfer, and the counter 218 is incremented "1" when the data ready signal is received. For example, when a 32 byte transfer is executed, the counter 218 is decremented "4" at the transfer, and since the data ready signal is output four time from the other side, the counter 218 is incremented +1 each time the data ready signal is output.

The four types of receive data buffer control methods were described above, but it is preferable to be able to switch the plurality of types of control methods according to a combination of the two chips of the chipset. For example, a control method is set at the initial setup when power is turned ON and this setup can be switched.

[Separation of Read Reply Data Buffer and Write Data Buffer]

The eighth embodiment is a method for increasing the efficiency of data transfer between the chip A and the chip B when the bridge chip B is connected to an interlock type bus. FIG. 18 are diagrams depicting the eighth embodiment.

Figure 18A:
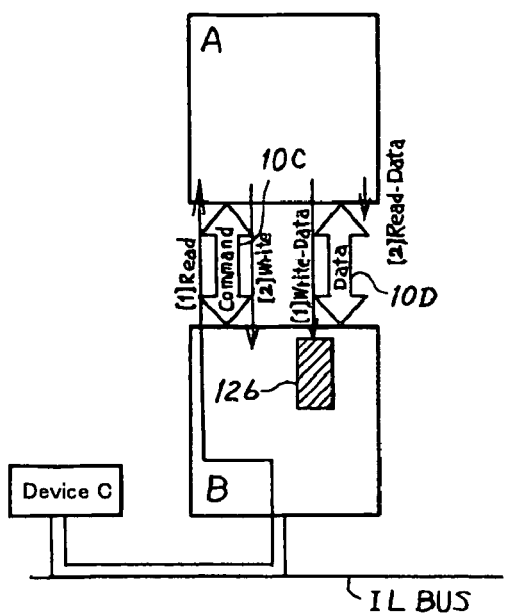
FIGS. 18A-18C are diagrams depicting an example when a receive data buffer is separated according to the eighth embodiment.

A configuration where the chip A and the chip B are connected via a command bus 10C and a data bus 10D and the chip B is also connected to another interlock type bus ILBUS, as FIG. 18A shows, will now be described. In an interlock type bus, a command transfer phase and a data transfer phase are not separated, so in the case of reading, the bus is locked and another command cannot be issued after the read command is issued until the read reply data is output to the bus ILBUS. In the case of a write command as well, another command cannot be issued after the write command is issued until the write data is sent to the bus ILBUS.

In such a system configuration, if a read command is issued from a device C on the interlock type bus ILBUS to the chip A via the chip B ([1] Read in FIG. 18), a write command is issued to the device C on the interlock type bus almost at the same time from the chip A to the chip B ([2] Write in FIG. 18), and the write data from the chip A is transferred first to the chip B ([1] Write-Data in FIG. 18), then the reply data ([2] Read-Data in FIG. 18) to the read command from the chip B may not be able to be returned.

For example, if the data buffer for receiving 126 of the chip B has a 64B capacity, and the data size of the write command from the chip A is 64B, then the chip A cannot return the read reply since the data buffer 126 is full. The data buffer 126 of the chip B must be open for the chip A to return the reply data. For this, the chip B must issue the write command, which was issued by the chip A, to the interlock type bus so as to output the write data. The interlock type bus ILBUS, however, received the read command and is now waiting for the reply, so the system enters a dead lock status.

Figure 18B:
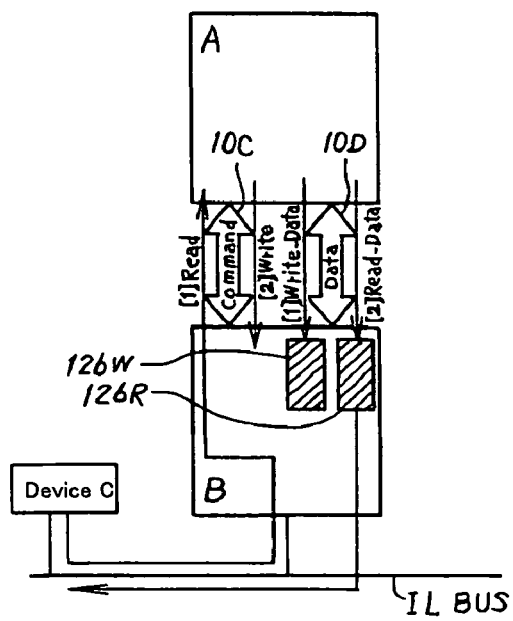

To avoid entering into such a dead lock status, the data buffer for receiving 126 of the chip B is separated into a write data buffer 126W for receiving write data and a read reply data buffer R126 for receiving read replay data, as shown in FIG. 18B. By this configuration, even if the write data from the chip A is transferred first, the read reply data which will be acquired later can be received by the separate read reply data buffer 126R. Therefore the read reply data is not blocked, the chip B can receive the read reply data from the chip A and output to the interlock type bus, the read transaction completes on the interlock type bus, and the chip B can continuously issue the write command, which was issued by the chip A, to the interlock type bus.

Figure 18C:
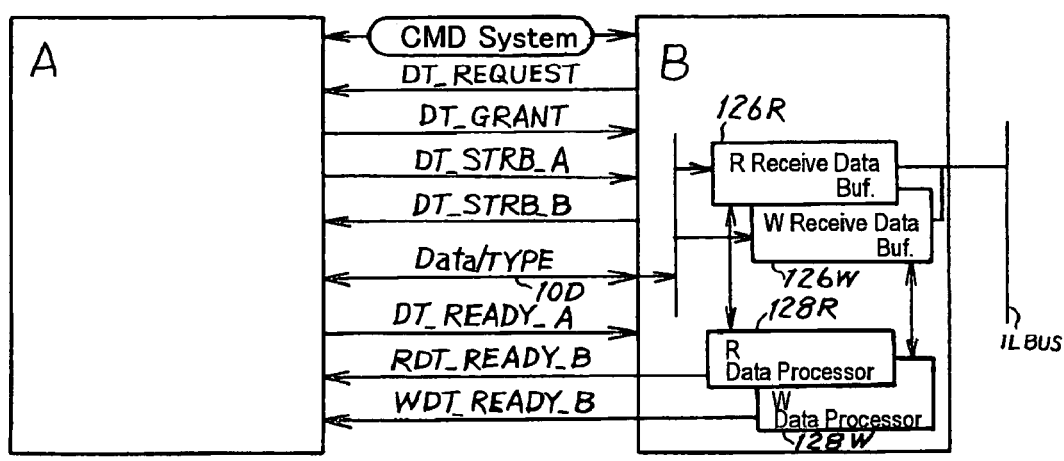

In this configuration, the data ready signal from the chip B to the chip A must also be separated into two signals, the data ready signal for write data WDT_READY_B and the data ready signal for read reply data RDT_READY_B, as shown in the block diagram in FIG. 18C. Accordingly, the data processing part to generate the data ready signal in the chip B is also separated into a part for read 128R and for write 128W.

When the chip A is connected to an interlock type bus, which is not illustrated, the data ready signal from the chip A to the chip B is also separated into two signals, the data ready signal for write data WDT_READY_A and the data ready signal for read reply data WDT_READY_A, and the above described control is performed.

When the chip B is connected to a bus which is not an interlock type, it is not necessary to separate the data buffer for receiving into two, since the above mentioned dead lock does not occur. It is preferable that the chip A can operate in both cases when the chip A is connected to the chip B which is to be connected to an interlock type bus and to the chip B which is to be connected to a non-interlock type bus, by including control circuits for both cases and switching the control operation depending on which type of chip B is connected.

[Embodiment Where Adding Access ID Makes Data Transfer Sequence Arbitrary]

In the methods described above, data must be transferred according to the sequence in which commands are issued. However, when processing time differs depending on the command, data for a command which was issued later may be ready first. So the ninth embodiment, where the data transfer sequence can be arbitrary, will now be described.

Figure 19A:
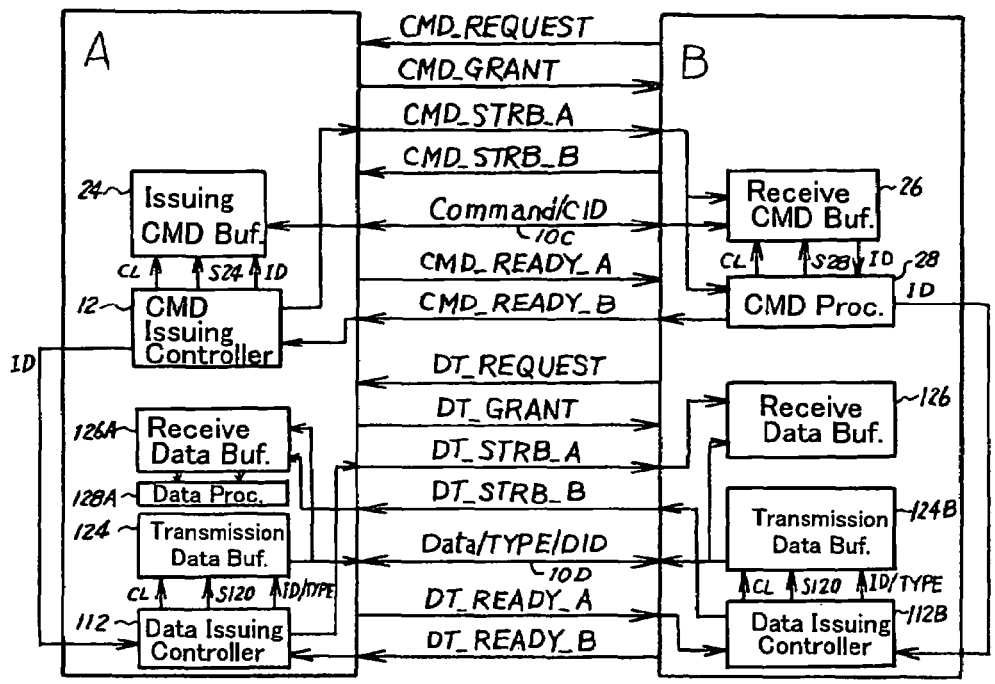
FIGS. 19A-19B are diagrams depicting the use of a command ID according to the ninth embodiment.

As FIG. 19A shows, corresponding access ID signals are added to the command of the command bus 10C and the data of the data bus 10D respectively. These access ID signals are called the "command ID signal CID" and the "data ID signal DID" respectively. When a command is issued, a unique command ID number CID is added to the command, and when data is output, the value of the corresponding command ID number CID is simultaneously output as a data ID number DID, so as to indicate the command which this data corresponds to. By this, the correspondence relationship between the command and the data can be known, which makes it unnecessary to match the command issuing sequence and the data transfer sequence.

The methods described thus far do not have ID signals which clearly indicate the correspondence between the command and the data, so the correspondence was an implicit correspondence by matching the command issuing sequence and the data transfer sequence. Even in the method shown in FIG. 18, where the access type signal is added to the data bus, data must be transferred adhering to the sequence within the group of read commands or within the group of write commands. With this method, however, even if data for a read command which is issued later is ready before the data for the previous read command, the data prepared first cannot be output to the data bus, therefore efficiency is poor.

By adding ID signals as mentioned above, the correspondence between the command and the data can be maintained even if data for which transfer is ready is output to the data bus regardless the command issuing sequence. Since it is unnecessary to hold the data prepared first, processing efficiency and data bus access efficiency can be improved.

Figure 19B:
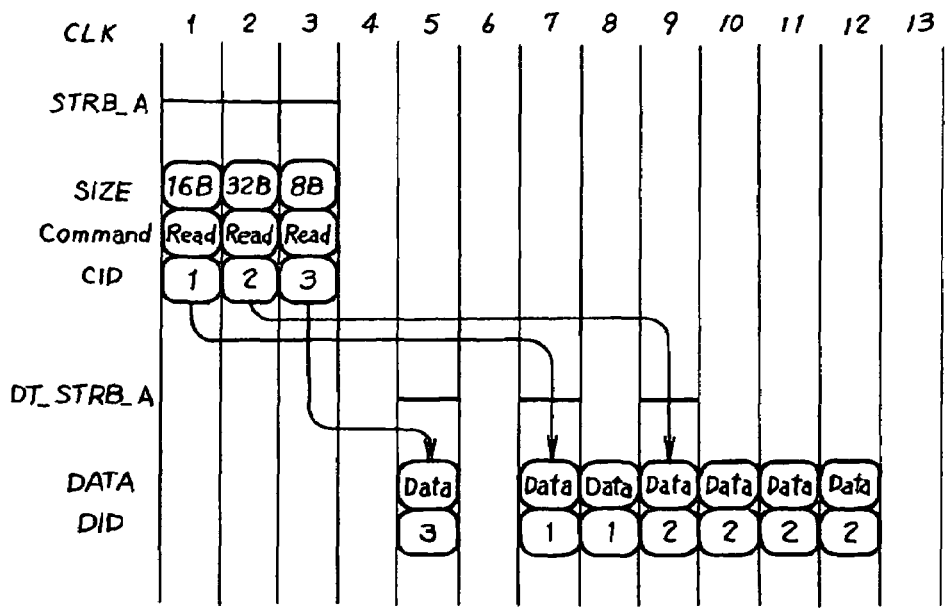

In the time chart shown in FIG. 19B, the chip A continuously issues the read command for three cycles, at the cycles 1, 2 and 3. Each command has a CID number, 1, 2 and 3. And at the cycle 5, 8 byte data corresponding to the command with CID3 is transferred from the chip B. For the cycle 7, 16 byte data corresponding to the command with CID1 is transferred from the chip B, and from the cycle 9, 32 byte data corresponding to the command with CID2 is transferred from the chip B. In a bus where an ID number is not added, the data corresponding to the command with CID3, which was transferred at the cycle 5, is held until the cycle 13.

If an LSI corresponding to the bus protocol where the ID numbers are added is connected to an LSI which does not correspond to the bus protocol, operation becomes abnormal since the data correspondence cannot be maintained. So, if an LSI corresponding to the bus protocol where the ID numbers are added can be set such that the LSI can operate even in a mode where the data transfer sequence must be maintained without using ID numbers by setting, then the LSI can be operated connecting with either an LSI corresponding to the bus protocol where the ID numbers are added or to an LSI which does not correspond to the bus protocol. Therefore it is preferable that the appropriate mode be set at initialization when power is turned ON.

FIG. 19A shows the configuration for assigning the above mentioned command ID number. Since the configuration of the parts, including the issuing buffer and the receive buffer shown here, are the same as that shown in FIG. 6 and FIG. 9, only a part of the configuration is shown in FIG. 19. Now, it is assumed that a read command is issued from the chip A to the chip B, and the read reply data is returned from the chip B to the chip A. The command issuing control circuit 12 of the chip A assigns a command ID to the issuing command buffer 24 and issues the command to the chip B while asserting the command strobe signal. The receiving command buffer 26 of the chip B receives the command and the ID number. The command processing part 28 transfers the command ID to the data issuing control circuit 112B. The data issuing control circuit 112B adds the ID number to the read reply data and issues the data from the transmission data buffer 124B to the chip A. The receiving data buffer 126A of the chip A receives the data and the ID number added to the received data. The data processing part 128A of the chip A refers to the added ID number and recognizes the command to which the reply data corresponds.

When the chip A issues a write command, the command issuing control circuit 12 adds the ID number to the write command and issues the write command from the issuing command buffer 24. This ID number is transferred to the data issuing control circuit 112. And the data issuing control circuit 112 adds this ID number to the write data and issues the write data from the transmission data buffer 124 to the chip B. The chip B refers to this ID number and recognizes the write command to which the write data corresponds.

[Inhibiting Access Immediately After Reset]

According to the methods described thus far, an LSI, the chip A for example, controls the status of the other LSI connected to, the chip B for example, and controls the status by receiving only the ready signals from the other LSI. Therefore when a command or data is output, it is assumed that the other LSI is in a status where the command or the data can be received.

However, if timing when the reset signals to be applied to the chip A and the chip B are negated shifts slightly to the direction where the chip B delays four cycles for example, and if the chip A issues the command to the chip B immediately after reset is cleared, then the chip B is still being reset at that point, so the chip B does not receive the command and does not respond to the command. As a result, an operation error occurs.

To avoid such a status, the chip A and the chip B have a respective counter for each other, so that the counter counts the number of cycles where the negating timing of the reset may shift, and during this time, the output of a command/data to the bus is inhibited. If a command/data is still output from the other chip, the command is accepted even during counting. By this, the timing shift at reset can be absorbed.

Figure 20A:
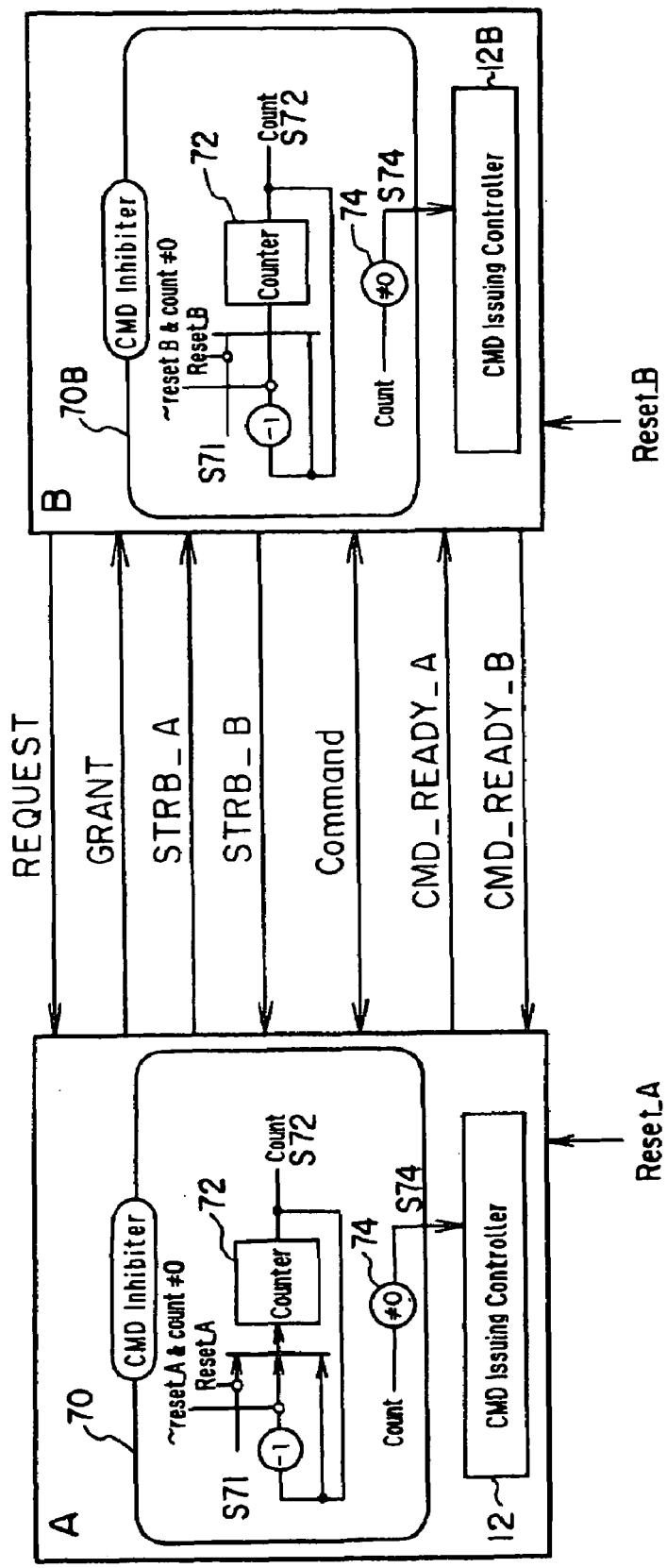
FIGS. 20A-20B are diagrams depicting the command issuing inhibition immediately after reset according to the tenth embodiment.

FIG. 20 are diagrams depicting the configuration to inhibit issuing a command immediately after reset according to the tenth embodiment. FIG. 20A shows the configuration where the command issuing inhibiting circuits 70 and 70B for inhibiting command issuing immediately after reset are provided in the chips A and B respectively. The command issuing inhibiting circuit 70 of the chip A comprises a counter 72 where the initial value S71 on the inhibiting period immediately after reset is loaded at reset, and an issuing inhibiting signal generation circuit 74 generates the issuing inhibiting signal S74 while the counter value S72 is not "0". The counter 72 is decremented synchronizing with the clock while the reset signal is not output and the counter value is not "0". The issuing inhibiting signal S74 is output to the command issuing control circuit 12. The command issuing inhibiting circuit 70B at the chip B side also has the same configuration.

Figure 20B:
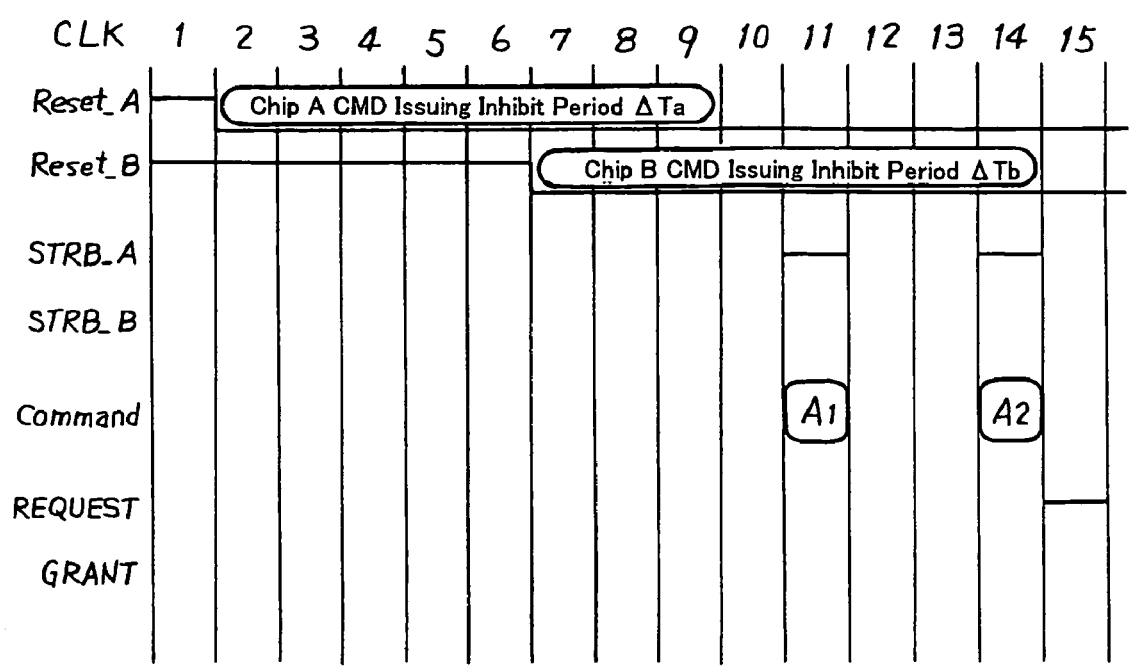

FIG. 20B is the operation timing chart when the command issuing inhibiting period is eight cycles. For example, it is assumed that the timing when reset is cleared may shift five cycles between the chip A and the chip B, and the counter 72 counts more than five cycles, eight cycles for example. As FIG. 20B shows, the reset signal applied to the chip A is cleared (negated) at the cycle 2, and the reset signal applied to the chip B is cleared at the cycle 7. The chips A and B inhibit issuing of a command during the eight cycles ΔTa and ΔTb respectively after the reset is cleared.

The chip A inhibits issuing of a command during the eight cycles ΔTa from the cycle 2 to the cycle 9, and the chip A issues a command A1 to the chip B at the cycle 11, which is two cycles after the inhibition is cleared. The chip B is still in the command issuing inhibition period ΔTb at this time, but can receive a command since reset has been cleared. Therefore the command from the chip A can be received. The chip B ends the command issuing inhibition period ΔTb at the cycle 14, and asserts the request signal REQUEST at the cycle 15.

In this way, issuing of a command is inhibited by the counter of the respective chip during a period longer than the period where the reset clear timing between the two chips may shift. Therefore, at the timing after the command issuing inhibition period of an LSI for which reset was cleared first has passed, it is guaranteed that the reset of the other LSI has been cleared. As a result, a command issued by the LSI for which reset was cleared first can always be received by the other LSI.

[Double Data Rates for Data Bus]

In the above mentioned embodiment, data is latched or data is changed at the rise edge of the clock signal, just like an ordinary logic circuit. If a data transfer is mostly a burst transfer, the access efficiency to the address bus is lower compared with a data bus. To improve the transfer speed of the bus, clock speed must be increased, but if an address bus where the access efficiency is low is also operated under a high-speed clock, power consumption increases.

A possible method therefore is operating only a data bus where the access efficiency is high under a high-speed clock, but if an address bus and a data bus operate under different clocks, other problems, such as skew between clocks, occur. Therefore, so the transfer rate is improved by changing data at both the rise edge and the fall edge of the clock only for the data bus, while using the same clock for both the address bus and the data bus. The address bus is also used as a command bus in the above mentioned embodiment, and the command bus transfers the address. Therefore, the command bus or the address bus has a single rate, where operation synchronizes at the rise edge of the clock, and the data bus has a double rate, where operation synchronizes at both edges of the rise and fall of the clock.

Figure 21:
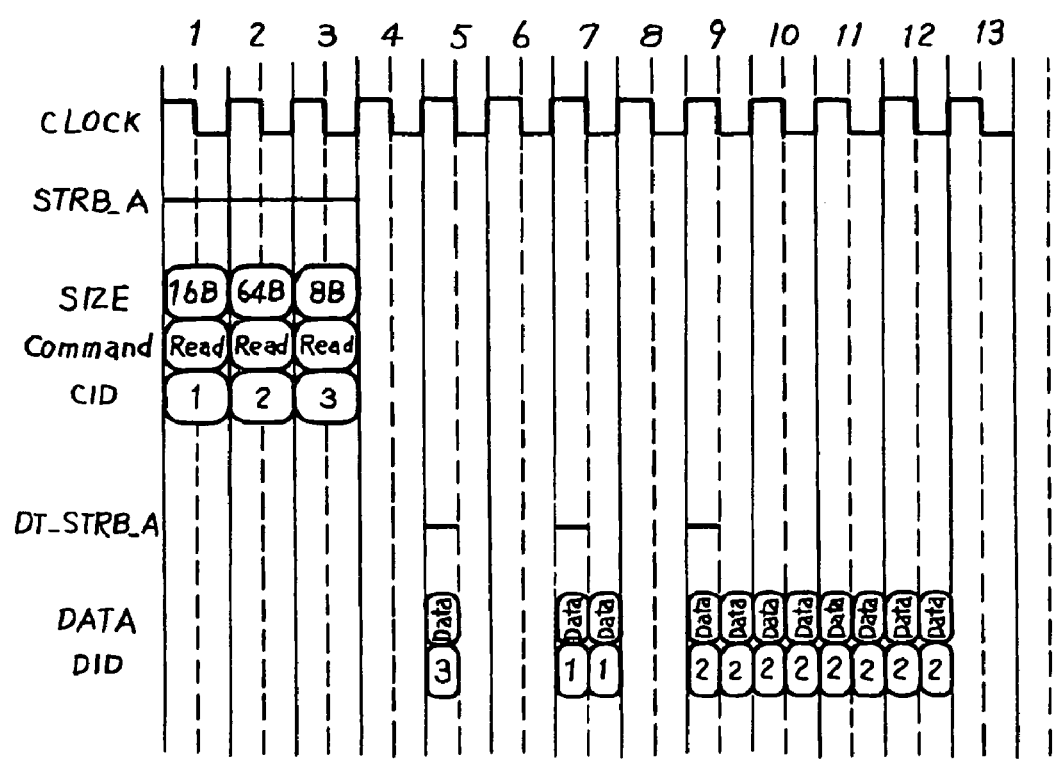
FIG. 21 is a diagram depicting the double data rate according to the eleventh embodiment.

FIG. 21 is a timing chart of the double data rate operation. The chip A continuously issues a read command for three cycles, cycles 1, 2 and 3. The data size is 16B, 64B and 8B respectively, and as the example in FIG. 19 shows, an ID number is assigned respectively. The chip B transfers data corresponding to the command ID number CID3 during the half cycle from the rise edge of the cycle 5. Then, the chip B transfers 16 byte data corresponding to the command ID number CID1 at the cycle 7. Since both edges of the clock are used for the data transfer, data is transferred twice (for 16B) during one cycle. Then the chip B transfers 64 byte data corresponding to the command ID number CID2 during four cycles from the cycle 9. 64B data is transferred by executing a burst transfer eight times during the four cycles.

In this way, the processing efficiency can be improved by using a double data rate for the data bus which volume of data to be transferred is large compared with a command bus or address bus.

According to the present invention, the command or the data issuing or transmission side LSI controls the status of the receive buffer of the receiving side LSI using the number of times of strobe signals which were output when the command or the data asserted by the receiving side LSI is issued, and the number of times of ready signals asserted by the receiving side LSI which were output for indicating the processing completed, and a command or data is issued as long as the receive buffer of the receiving side LSI is open, and the issue of a command or data is inhibited when the receive buffer is full. Therefore, even when the operating frequency of the bus reaches high-speed, the issuing or transmission side LSI can continuously issue a command or data at high-speed without receiving a busy signal from the receiving side LSI. As a result, bus access frequency can be improved.

The protective range of the present invention is not limited to the above mentioned embodiments, but covers the invention stated in the claims and the equivalents thereof.

What is claimed is:

1. An integrated circuit device which is a first LSI and issues data to a second LSI to make the second LSI execute a corresponding processing, said first and second LSIs being connected with a bidirectional command bus, comprising:
   a counter where the number of data stages which said second LSI can simultaneously receive is set at a reset, and which is decremented or incremented when said data is issued and is incremented or decremented when a ready signal indicating completion of processing corresponding to the data is received from said second LSI; and
   a data issuing control circuit which inhibits issuing of said data when said counter value becomes a predetermined value;
   wherein said first and second LSIs are connected with a bi-directional data bus, said first LSI further comprising:
   an arbiter circuit which issues a grant signal for granting access to said data bus to said second LSI responding to a request signal for requesting access to said data bus from said second LSI,
   wherein said data issuing control circuit inhibits issuing of data when said grant signal is issued.

* * * * *